(12) United States Patent
Berman et al.

(10) Patent No.: US 11,123,713 B2
(45) Date of Patent: Sep. 21, 2021

(54) MULTICOMPONENT INORGANIC POROUS MATERIALS AND METHODS OF MAKING THE SAME

(71) Applicants: UCHICAGO ARGONNE, LLC, Chicago, IL (US); UNIVERSITY OF NORTH TEXAS, Denton, TX (US); THE BOARD OF TRUSTEES OF THE LELAND STANFORD JUNIOR UNIVERSITY, Palo Alto, CA (US)

(72) Inventors: Diana Berman, Lemont, IL (US); Elena Shevchenko, Riverside, IL (US); Matteo Cargnello, Stanford, CA (US); Benjamin Diroll, Chicago, IL (US); Emmett Goodman, Stanford, CA (US)

(73) Assignees: UCHICAGO ARGONNE, LLC, Chicago, IL (US); UNIVERSITY OF NORTH TEXAS, Denton, TX (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 124 days.

(21) Appl. No.: 16/452,451

(22) Filed: Jun. 25, 2019

(65) Prior Publication Data
US 2020/0406235 A1 Dec. 31, 2020

(51) Int. Cl.
| | | |
|---|---|---|
| B01J 23/75 | (2006.01) | |
| B01J 23/44 | (2006.01) | |
| B01J 23/46 | (2006.01) | |
| B01J 21/04 | (2006.01) | |
| B01J 35/04 | (2006.01) | |
| B01J 35/00 | (2006.01) | |
| B01J 37/34 | (2006.01) | |
| B01J 37/02 | (2006.01) | |

(Continued)

(52) U.S. Cl.
CPC ............... *B01J 23/75* (2013.01); *B01J 21/04* (2013.01); *B01J 23/44* (2013.01); *B01J 23/462* (2013.01); *B01J 35/0013* (2013.01); *B01J 35/04* (2013.01); *B01J 37/0018* (2013.01); *B01J 37/0203* (2013.01); *B01J 37/024* (2013.01); *B01J 37/0205* (2013.01); *B01J 37/086* (2013.01); *B01J 37/345* (2013.01); *B01J 37/349* (2013.01)

(58) Field of Classification Search
CPC . B01J 21/04; B01J 23/44; B01J 23/462; B01J 23/75; B01J 35/0013; B01J 35/04; B01J 37/0018; B01J 37/0203; B01J 37/0205; B01J 37/024; B01J 37/086; B01J 37/345; B01J 37/349
See application file for complete search history.

(56) References Cited

U.S. PATENT DOCUMENTS

| | | |
|---|---|---|
| 8,318,248 B2 | 11/2012 | Elam et al. |
| 8,980,418 B2 | 3/2015 | Darling et al. |
| 2018/0122648 A1* | 5/2018 | Kim .................... H01L 21/3086 |

OTHER PUBLICATIONS

Anderson et al., Catalytic oxidation of methane, Industrial & Enginering Chemistry, 53:809-12 (1961).

(Continued)

*Primary Examiner* — Brian A McCaig
(74) *Attorney, Agent, or Firm* — Marshall, Gerstein & Borun LLP

(57) ABSTRACT

Provided herein is a method of preparing a porous composite ceramic material and a porous composite ceramic material made by the method of preparing.

19 Claims, 24 Drawing Sheets

(51) Int. Cl.
  B01J 37/08  (2006.01)
  B01J 37/00  (2006.01)

(56) References Cited

OTHER PUBLICATIONS

Berman et al., Impact of oxygen and argon plasma expos surfaces, Thin Solid Films 520 (2012) 6201-6.
Berman et al., Sequential Infiltration Synthesis for the De Coatings with Controllable Thickness, ACS Nano, 11 (3):25.
Choi et al., Structural modification of poly(methyl methacrylate) by proton irradiation, Appl. Surf. Sci. 169-170 (2001) 433-7.
Chudasama et al., Pore-size engineering of Zeolite A for separation, Industrial & Engineering Chemistry Research, <.
Dusoe et al., Ultrahigh Elastic Strain Energy Storage in Metal-Oxide Infiltrated Patterned Hybrid Polymer Nanocomposites, Nano Lett., 17(12):7416-23 (Oct. 2017).
Farrauto et al., Catalytic chemistry of supported palladium for combustin methane, Applied Catalysis A: General 81 (1992) 227-37.
Feng et al. Alumina over-coating on Pd nanoparticle catalysts by atomic layer dispostion: Enhanced stability and reactivity, Catal. Lett., 141:512-7 (2011).
Freund et al., CO Oxidation as a Prototypical Reaction for Heterogenous Processes, Agnew. Chern. Int. Ed. 50 (2011) 10064-94.
Gandhi et al., Automotive exhaust catalysis, J. Catal., 216: 433-42 (2003).
Gates, Supported Metal Clusters: Synthesis, Structure, and Catalysts, Chem. Rev., 95(3):511-22 (1995).
Goodman et al., Mechanistic Understanding and the Rational Design of Sinter-Resistant Heterogeneous Catalysts, ACS Catalysis 7 (2017) 7156-73.
Gulati et al., Optimizing anodization conditions for the growth of titania nanotubes on curved surfaces, J. Phys. Chem. C, 119:16033-45 (2015).
Henry, Palladium catalyzed oxidation of hydrocarbons, Springer Science & Business Media 1980.
Kamal et al., Catalytic oxidation of volatile organic compo Environment, 140:117-34 (Sep. 2016).
Kumar et al., Formation of NaCl- and Cu2O-type oxides of platinum and palladium on carbon and alumina support films, Journal of the Less Common Metals 147 (1989) 59-71.
Lee et al., Effect of trapped water on the frictional behavior of graphene oxiide layers sliding in water environment, Carbon 120 (2017) 11-16.
Lee et al., Inhibitor or promoter: Insights on the corrosion evolution in a graphene protected surface, Carbon 126 (2018) 225-31.
Li et al., Effect of starch addition on microstructure and properties of highly porous alumina ceramics, Ceramics International, 39:8833-9 (2013).
Li et al., On the growth of highly ordered opres in anodized aluminum oxide, Chemistry of Materials, 10:2470-80(1998).
Lu et al., Coking- and Sintering-Resistant Palladium Catalysts Achieved Through Atomic Layer Deposition, Science, 335(6073):1205-8 (Mar. 2012).
Martin et al., Characterization of a quartz crystal microbalance with simulatenous mass and liquid loading, Anal. Chem. 63 (1991) 2272-81.
Murata et al., The Metal-Support Interaction Concerning the Particle Size Effect of Pd/Al2O3 on Methane Combustion, Angew. Chem. Int. Ed. 56 (2017) 1593-7.
Nakanishi, Infrared absorption spectroscopy, practical, (1962).
Parlett et al., Hierarchical porous materials: catalytic applications, Chem. Soc. Rev., 42(9):3876-93 (2013).
Peng et al., A route to nanoscopic materials via sequential infiltration synthesis on block copolymer templates, ACS Nano, 5(6):4600-6 (Jun. 2011).
Peng et al., Nanoscopic patterned materials with tunable dimensions via atomic layer disposition on block copolymers, Adv. Mater., 22(45):5129-33 (Dec. 2010).
Perego et al., Porous materials in catalysis: challenges for mesoporous materials, Chem. Soc. Rev., 42:3956-76 (2013).
Perez-Ramirez et al., Hierarchical zeolites: enhanced utilisation of microporous crystals in catalysis by advances in material design, Chem. Soc. Rev., 37:2530-42 (2008).
Rassoul et al., Synthesis and Characterisation of Bimetallic Pd-Rh/Alumina Combustion Catalysts, J. Catal., 203(1):232-41 (Oct. 2001).
Roth et al., A family of zeolites with controlled pore size prepared using a top-down method, Nat. Chem., 5:628 (2013).
Sales et al., Alumina-supported Pd, Ag and Pd-Ag catalysts: preperation througho the polyol process, characterization and reactivity in hexa-1,5-diene hydrogenation, Applied Catalysis A: General 172 (1998) 273-83.
She et al., Accessibility of the pores in highly porous alumi films synthesized via sequential infiltration synthesis, Nanotechnology, 29(49): 495703 (Oct. 2018).
She et al., Effect of the Micelle Opening in Self-assembled Amphiphillic Block Co-polymer Films on the Infiltration of Inorganic Precursors, Langmuir, 35(3): 796-803 (2019).
She et al., Rapid Synthesis of Nanoporous Conformal Coatings via Plasma-Enchanced Sequential Infiltration of a Polymer Template, ACS Omega, 2(11):7812-0 (Nov. 2017).
Shi et al., Recent advances of pore system construction in zeolite-catalyzed chemical industry processes, Chem. Rev. Soc., 44:8877-903 (2015).
Shin et al., Copper foam structures with highly porous nanostructured walls, Chemistry of Materials, 16:5460-4 (2004).
Shin et al., Porous tin oxides prepared using an anodic oxidation process, Adv. Mater., 16:237-40 (2004).
Suh et al., Sub-10-nm patterning via directed self-assembly of block copolymer films with a vapour-phase deposited topcoat, Nat. Nanotechnol., 12:57.
Sun et al., Characterization of Palladium Nanoparticles by Using X-ray Reflectivity, EXAFS, and Electron Microscopy, Langmuir 22 (2006) 807-16.
Toebes et al., Synthesis of supported palladium catalysts, J. Mol. Catal. A: Chem. 173 (2001) 75-98.
Trimm et al., The control of pore size in alumina catalyst supports: A review, Applied Catalysis, 21:215-238(1986).
Tsuchiya et al., Sel-organized high aspect ratio porous hafnium oxide prepared by electrochemical anodization, Electrochem. Commun., 7:49-52 (2005).
Tsui et al., Titania nanotubes by electrochemical anodization for solar energy conversion, J. Electrochem. Soc., 161 :D3066-D3077 (2014).
Turkevich et al., Palladium: preparation and catalytic properties of particle size unfirom size, Science 169 (1970) 873-9.

\* cited by examiner

MULTICOMPONENT INORGANIC POROUS MATERIALS AND METHODS OF MAKING THE SAME

STATEMENT OF GOVERNMENT SUPPORT

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

Many catalysts are synthetized by the deposition of the catalytically active component on the surface of porous matrix. However, often such structures generally do not have a good thermal stability. For example, catalytic components can sinter when exposed at high temperatures, forming large aggregates, which significantly lowers the catalytic activity. Atomic layer deposition was explored to improve the thermal stability of the catalysts. However, such deposition was found to block the catalytic surface. Highly porous multicomponent heterostructures with easily accessible catalytic centers are of great interest for catalysis (Gates et al., Chem. Rev. 95 (1995) 511-522; Parlett et al., Chem. Soc. Rev. 42 (2013) 3876-3893). Development of highly reactive catalysts for conversion of combustion reaction gasses remains an active research area over the past decades (Rassoul et al., J. Catal. 203 (2001) 232-241).

SUMMARY

In embodiments, a method of preparing a porous composite ceramic material having nanoparticles embedded in an inorganic matrix, can include immersing a block copolymer having polar and nonpolar domains in a swelling solution comprising solvent and one or more nanoparticle precursors, wherein upon immersion in the swelling solution, the block copolymer swells and the nanoparticle precursor adsorbs onto functional groups in the polar domain of the swelled block copolymer to form a nanoparticle precursor infiltrated swelled block copolymer. The method can further include exposing the nanoparticle precursor infiltrated swelled block copolymer to a gaseous inorganic matrix material precursor using one or more cycles of sequential infiltration synthesis (SIS) to infiltrate the polar domain with an inorganic matrix material and form an inorganic matrix infiltrated swelled block copolymer. The method can also include removing the block copolymer and converting the nanoparticle precursor to nanoparticles by one or more of thermally annealing the inorganic matrix infiltrated swelled block copolymer in the presence of oxygen at a temperature in the range of 300° C. to 700° C., exposing the inorganic matrix infiltrated swelled block copolymer to $O_2$ plasma, and irradiating the inorganic matrix infiltrated block copolymer with UV light in the presence of ozone, thereby forming the composite ceramic.

In embodiments, a method of preparing a porous composite ceramic material having nanoparticles embedded in an inorganic matrix, can include immersing a block copolymer having polar and nonpolar domains in a swelling solution comprising solvent and nanoparticles, wherein upon immersion in the swelling solution, the block copolymer swells and the nanoparticles adsorb onto functional groups in the nonpolar domains of the swelled block copolymer to form a nanoparticle infiltrated swelled block copolymer. The method can further include exposing the nanoparticle infiltrated swelled block copolymer to a gaseous inorganic matrix material precursor using one or more cycles of sequential infiltration synthesis to infiltrate the polar domains with an inorganic matrix material and form an inorganic matrix infiltrated swelled block copolymer. The method can also include removing the block copolymer by one or more of thermally annealing the inorganic matrix infiltrated swelled block copolymer in the presence of oxygen at a temperature in the range of 300° C. to 700° C., exposing the inorganic matrix infiltrated swelled block copolymer to $O_2$ plasma, and irradiating the inorganic matrix infiltrated swelled block copolymer with UV light in the presence of ozone to thereby form the porous composite ceramic.

The present disclosure also relates to a porous composite ceramic material as prepared by any of the methods herein.

DETAILED DESCRIPTION

Figure 1A:
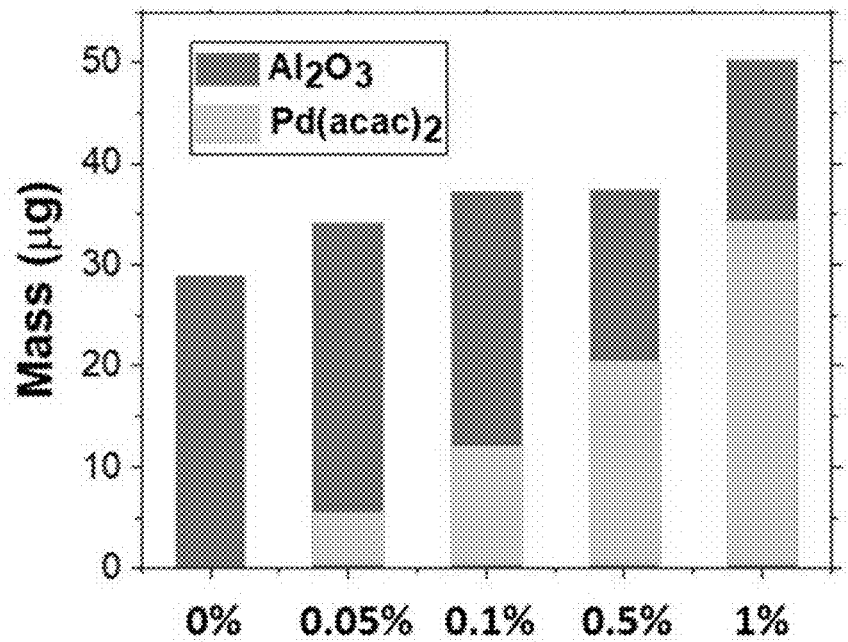
FIG. 1A is a graph showing the mass change during swelling induced adsorption of $Pd(acac)_2$ and SIS adsorption of alumina as a function of $Pd(acac)_2$ concentration in ethanol, in accordance with embodiments of the disclosure.

In accordance with embodiments, a method of preparing porous composite inorganic material is provided, wherein the inorganic material can include a ceramic material. The porous composite ceramic material can include nanoparticles (NPs) embedded in an inorganic matrix. The porous composition ceramic material can be used in various applications such as catalysts and sensors. It has been advantageously found that the composite ceramic materials made in accordance with the methods of the disclosure have improved thermal stability and are able to resist sintering at elevated temperatures of up to 1200° C. In embodiments, the porous composite ceramic materials can have resistances to sintering at temperature of up to about 1200° C., or up to about 1000° C., or up to about 900° C., or up to 800° C.

Without being bound to theory, the resistance to sintering observed in the porous composite ceramic material made by the methods described herein can be a result of stronger adhesion of the nanoparticles to the ceramic material, as well as, the nanoparticles being well embedded in the inorganic matrix, making the nanoparticles less mobile. For example, a porous composite ceramic material made by the methods herein can include nanoparticles that are imperfectly encased in the inorganic matrix such that the nanoparticles are locked into place yet still having sufficient surface area available to allow for catalytic activity to occur at the nanoparticle.

Embodiments of the method can advantageously allow for porous ceramics to be formed having two or different types of nanoparticles infiltrated therein, as well as having two or more ceramic materials including mixed ceramic and layered structures.

Embodiments of the method can utilize polymer-swelling assisted sequential infiltration synthesis (SIS). Quartz crystal microbalance (QCM) studies reveal high interconnectivity of pores in inorganic structures prepared via polymer swelling-assisted SIS.

Conventional SIS was developed to pattern metal oxides materials via selective infiltration of the polar domains of the block copolymer (BCP) templates with inorganic vapors and subsequent removal of the polymer through thermal annealing (Peng et al., Acs Nano 5 (2011) 4600-4606; Peng et al., Adv. Mater. 22 (2010) 5129-5133). SIS has been utilized to pattern alumina, titanium oxide, zinc oxide, and silicon oxide (Suh et al., Nat Nano advance online publication (2017); Dusoe et al., Nano Lett. 17 (2017) 7416-7423). All these structures demonstrated high reproducibility of the block copolymer template pattern, enabling the synthesis of horizontal and vertical ceramic structures. However, the thickness of coatings obtained by conventional SIS is limited by the depth of diffusion of inorganic precursors from the vapor phase into a polymer template. For example, for standard BCP templates such as polymethylmethacrylate/polystyrene (PMMA/PS) and polyvinyl pyridine/polystyrene (PVP/PS), this value is ~40 nm (She et al., ACS Omega 2 (2017) 7812-7819; Berman et al., ACS Nano 11 (2017) 2521-2530). However, the swelling of the BCP template with a polar solvent (e.g. ethanol) allows increasing of the infiltration depth significantly through the introduction of additional porosity channels and has been used to produce anti-reflective alumina coatings on glass and highly porous alumina coatings for humidity sensing (She et al., Effect of the micelle opening in self-assembled amphiphilic block copolymer films on the infiltration of inorganic precursors, Langmuir (2019); and She et al., Nanotechnology 29 (2018) 495703).

In embodiments, the method can include swelling a block copolymer and infiltrating the block copolymer with nanoparticle precursor materials, exposing the nanoparticle precursor infiltrated swelled block copolymer to a gaseous inorganic matrix material precursor using one or more cycles of sequential infiltration synthesis, and removing the block copolymer and converting the nanoparticle precursor to nanoparticles. In such embodiments, the block copolymer can be swelled by immersing the block copolymer in a swelling solution that includes solvent and one or more nanoparticle precursors. Without intending to be bound by theory, it is believed that upon swelling of the block copolymer, the nanoparticle precursor adsorb onto functional groups in the polar domain of the block copolymer.

In embodiments, the block copolymer can be removed and the nanoparticle precursor can be converted to nanoparticles by any one or more of (1) thermally annealing the inorganic matrix infiltrated swelled block copolymer in the presence of oxygen at a temperature in the range of 300° C. to 700° C., (2) exposing the inorganic matrix infiltrated swelled block copolymer to $O_2$ plasma, or (3) irradiating the inorganic matrix infiltrated block copolymer with UV light in the presence of ozone to remove the block copolymer and convert the nanoparticle precursor to nanoparticles thereby forming the composite ceramic.

In embodiments, the method can include preparing the composite ceramic material using nanoparticles as opposed to nanoparticle precursors. Methods allowing for incorporation of pre-formed nanoparticles can be advantageous in allowing more complex nanoparticle compositions to be utilized, as well as multiple distinct nanoparticle compositions. Methods in accordance with the disclosure can advantageously allow for such incorporation of preformed nanoparticles, while maintaining substantially the structural features, such as size and shape of the original nanoparticles and having composite ceramic structures that are resistant to sintering at elevated temperatures. The method can include swelling the block copolymer and infiltrating the swelled block copolymer with nanoparticles, exposing the nanoparticle infiltrated swelled block copolymer to a gaseous inorganic matrix material precursor using one or more cycles of sequential infiltration synthesis to infiltrate the polar domains with an inorganic matrix material, and removing the block copolymer. In embodiments, the block copolymer can be swelled by immersing the block copolymer in a swelling solution comprising solvent and nanoparticles. Without intending to be bound by theory, it is believed that as the block copolymer swells the nanoparticles adsorb onto functional groups in the nonpolar domains of the swelled block copolymer.

In embodiments, the block copolymer can be removed by one or more of (1) thermally annealing the inorganic matrix infiltrated swelled block copolymer in the presence of oxygen at a temperature in the range of 300° C. to 700° C., exposing the inorganic matrix infiltrated swelled block copolymer to $O_2$ plasma, or irradiating the inorganic matrix infiltrated swelled block copolymer with UV light in the presence of ozone to remove the block copolymer to thereby form the composite ceramic.

In various embodiments, the method can further include depositing the block copolymer onto a two-dimensional support or infiltrating the block copolymer into a three-dimensional support prior to swelling the block copolymer. Various supports structures are known in the art and one or more of known supports can be used. In embodiments, the two-dimensional support can include one or more of paper, plastic, metal, and ceramic. In embodiments, the three-dimensional support can include one or more of a filter, foam, and a sponge.

In embodiments, the block copolymer can be amphiphilic. In embodiments, the block copolymer can include a polar domain and a nonpolar domain. In embodiments, the block copolymer can include at least two blocks, at least three blocks, at least four blocks, at least five blocks, or at least six blocks. The block copolymer can include two blocks, three blocks, four blocks, five blocks, or six blocks.

In embodiments, the polar domain can include any one or more of poly(vinyl-substituted nitrogen heterocycle)s, poly(alkyl (meth)acrylate)s, poly((meth)acrylic acid)s, poly(alkylene oxide)s, poly(arylene oxide)s, poly(arylene sulfide)s, poly(vinyl alkanoates), poly(vinyl ether)s, poly(vinyl halide)s, poly(vinyl alcohol)s, polyurethanes, poly(meth)

acrylonitriles, polyesters, polyamides, polyimides, polycarbonates, polysulfones, and polysiloxanes.

In embodiments, the polar domain can include a poly (vinyl-substituted nitrogen heterocycle) block. A vinyl-substituted nitrogen heterocycle is a cyclic compound having at least one nitrogen atom in the ring and a vinyl group attached directly to the ring. Vinyl-substituted nitrogen heterocycles that can be polymerized to form the poly(vinyl-substituted nitrogen heterocycle) block include, for example, the polymerization products of 2-vinylpyridine, 3-vinylpyridine, 4-vinylpyridine, 2-methyl-5-vinylpyridine 1-vinylimidazole, 2-vinylimidazole, 4-vinylimidazole, N-vinyl-2-methylimidazole, N-vinyl-2-ethylimidazole, 2-vinylpyrrole, 3-vinylpyrrole, and mixtures thereof. In some embodiments, the block copolymer comprises a poly (4-vinylpyridine) block.

In embodiments, the nonpolar domain can include any one or more of polyolefins, poly(alkenyl aromatic)s, poly(conjugated dienes)s, hydrogenated poly(conjugated dienes)s.

In embodiments, the nonpolar domain can include a poly(alkenyl aromatic). The poly(alkenyl aromatic) can include polystyrene and/or polystyrene derivatives. The polystyrene derivatives can include one or more substituents, such as methyl, ethyl, i-propyl, t-butyl, and a halogen, such as fluorine, chlorine, bromine, or iodine.

In embodiments, the block copolymer can be polystyrene-b-poly (4-vinylpyridine) ("PS-b-P4VP"), polyvinyl pyridine/polystyrene ("PVP/PS"), polymethylmethacrylate/polystyrene ("PMMA/PS"), polystyrene/polyethylene ("PS/PE"), or combinations thereof.

The molecular weights of the block copolymer blocks can vary widely, depending on the intended domain structure of the block copolymer. For example, the number average molecular weight of each block can be about 2,000 to about 1,000,000 atomic mass units, specifically about 5,000 to about 500,000 atomic mass units, more specifically about 10,000 to about 200,00 atomic mass units.

In embodiments, the swelling solution can include one or more solvents. Various solvents can be used alone or in combinations. The solvent can be present as a liquid, a gas, or a combination thereof. In embodiments, the solvent can include one or more of a nonpolar solvent, a polar protic solvent, and a polar aprotic solvent. Selection of a suitable solvent for swelling of the block copolymer is within the ordinary skill in the and car various depending on the block copolymer composition.

In embodiments, the nonpolar solvent can include one or more of cyclohexane, hexanes, pentanes, octane, 1-chloropentane, benzene, and toluene.

In embodiments, the polar protic solvent can include one or more of methanol, ethanol, isopropanol, butanol, water, formic acid, formamide, nitromethane, and acetic acid. In embodiments, the solvent is a polar protic solvent. In embodiments, the solvent is ethanol.

In embodiments, the polar aprotic solvent can include one or more of chloroform, anisole, dichloromethane, dimethylsulfoxide, N,N-dimethylformamide, acetonitrile, ethyl acetate, methyl ethyl ketone, acetone, diethyl ether, and tetrahydrofuran.

In embodiments, the swelling solution can include one or more nanoparticle precursors. The one or more nanoparticle precursors can include one or more metal complexes. In embodiments, the metal complex can include a transition metal salt. In embodiments, the transition metal salt can include one or more of a halide, amine, hydroxide, water, acetonitrile, carbonyl, such as acetate or acac, pyridine or derivatives thereof, phosphine, hydride, methyl, thiocyanate, and alkoxide. In embodiments, the nanoparticle precursor can include one or more of $Pd(acac)_2$, $Pt(acac)_2$, $Ni(acac)_2$, $Cu(acac)_2$, $Zn(acac)_2$, $Co(acac)_2$, $Ru(acac)_2$, $Al(acac)_3$, $Mn(acac)_2$, $Mn(acac)_3$, $Fe(acac)_3$, and $Mg(acac)_2$, wherein "acac" is an abbreviation for acetyl acetonate. In embodiments, the nanoparticle precursor can include one or more of $Pd(OAc)_2$, $Pt(OAc)_2$, $Ni(OAc)_2$, $Cu(OAc)_2$, $Zn(OAc)_2$, $Co(OAc)_2$, $Ru(OAc)_2$, $Al(OAc)_3$, $Mn(OAc)_2$, $Mn(OAc)_3$, $Fe(OAc)_3$, and $Mg(OAc)_2$, wherein "OAc" is an abbreviation for acetate.

In embodiments, the amount of nanoparticle precursor present in the swelling solution can be dependent on the saturation point of the solvent in the swelling solution. For example, $Pd(acac)_2$ can be dissolved in ethanol until the saturation point of ethanol, which can be about 10 wt % $Pd(acac)_2$ based on the total weight of the solution at room temperature. However, in embodiments, the amount of nanoparticle precursor added can include being less than the saturation point of the solvent in the swelling solution. In embodiments, the nanoparticle precursor can be present in the swelling solution in an amount of about 0.001 wt % to about 10 wt % based on the total weight of the solution, or about 0.01 wt % to about 8 wt %, or about 0.01 wt % to about 5 wt %, or about 0.01 wt % to about 2 wt %, or about 0.05 wt % to about 2 wt %. For example, the nanoparticle precursor can be present in the swelling solution in an amount of about 0.001 wt %, 0.005 wt %, 0.01 wt %, 0.05 wt %, 0.1 wt %, 0.5 wt %, 1 wt %, 1.5 wt %, 2 wt %, 3 wt %, 4 wt %, 5 wt %, or 10 wt %, based on the total weight of the solution.

In embodiments, the block copolymer and the nanoparticles can be mixed together prior to immersing in the swelling solution. In embodiments, the block copolymer and the nanoparticles can be mixed together in a solvent, such as toluene. In embodiments, the block copolymer and the nanoparticles can be mixed together using sonication. In embodiments, the block copolymer and the nanoparticle mixture can include nanoparticles present in an amount of about 0.01 wt % to 80 wt % based on the weight of the block copolymer. Without intending to be bound by theory, it is believed that amounts of nanoparticles in excess of 80 wt % based on the weight of the block copolymer can result in agglomeration of the nanoparticles can occur.

The nanoparticles can include one or more of metal nanoparticles and elemental nanoparticles. The nanoparticles can include alloys, borides, carbides, nitrides, oxides, phosphides, sulfides, and the like. The nanoparticles can include one or more transition metals and transition metal oxides, nitrides, and carbides. In embodiments, the nanoparticles can include one or more of Pd, Pt, Ni, Co, Ru, Mn, Fe, Mg, Cr, Cu, Zn, Zr, Ti, Rh, Ag, Au, Hf, W, Ir, and Hg. In embodiments, the nanoparticles can include $Pd_xO_y$, $Pt_xO_y$, $Co_xO_y$, $Ru_xO_y$, $Mn_xO_y$, $Fe_xO_y$, and $Mg_xO_y$, wherein x is from 0.1 to 4 and y is from 0.1 to 7.

The amount of nanoparticles present in the final ceramic material can be tailored by controlling the amount of nanoparticles admixed with the block copolymer or nanoparticle precursor present in the swelling solution. It has been advantageously found that swelled block copolymers can have a high capacity for adsorbing nanoparticles and/or nanoparticle precursor material. For example, in embodiments, assuming excess amount of nanoparticles in the admixture with the block copolymer and/or nanoparticle precursor in the swelling solution, the nanoparticle precursor or nanoparticle infiltrated swelled block copolymer can have about 0.01 wt % to about 80 wt % nanoparticles and/or nanoparticle precursor adsorbed into the block copolymer In embodiments, the nanoparticle precursor is present in the swelling solution in amount of about 0.001 wt % to about 10 wt %, which can result in nanoparticle infiltration amount of 0.01 wt % to 80 wt % of total weight of the swelled block copolymer. In embodiments, the nanoparticle infiltration amount can include an amount of about 1 wt % to about 70 wt %, about 5 wt % to about 60 wt %, or about 10 wt % to about 60 wt %, or about 20 wt % to about 60 wt %, or about 30 wt % to about 50 wt %. For example, the nanoparticle infiltration amount can include an amount of about 1 wt %, 5 wt %, 10 wt %, 20 wt %, 30 wt %, 40 wt %, 50 wt %, 60 wt %, 70 wt %, or 80 wt %.

In various embodiments, the block copolymer can be swelled under room temperature conditions. In other embodiments, the swelling solution can be heated prior and/or during immersion of the block copolymer. In embodiments, the swelling solution can be heated during or prior to immersion to a temperature of about 20° C. to about 200° C., or about 30° C. to about 150° C., or about 50° C. to about 125° C., or about 50° C. to about 100° C., or about 60° C. to about 80° C. For example, the temperature can be about 20° C., 30° C., 40° C. 50° C., 55° C., 60° C., 65° C., 70° C., 75° C., 80° C., 90° C., 100° C., 125° C., 150° C., or 200° C.

In embodiments, the block copolymer can reside in the swelling solution for about 5 minutes to about 5 hours, or about 10 minutes to about 5 hours, or about 30 minutes to about 3 hours, or about 30 minutes to about 2 hours. For example, the block copolymer can reside in the swelling solution for about 5 minutes, 10 minutes, 20 minutes, 30 minutes, 1 hour, 2 hours, 3 hours, 4 hours, or 5 hours.

The method of preparing a porous composite ceramic material can further include, after immersing the block copolymer in the swelling solution, removing excess swelling solution from the nanoparticle precursor infiltrated swelled block copolymer. For example, excess swelling solution can be removed by drying in air or under flow of inert gas. Drying can be done with or without heating.

Examples of sequential infiltration synthesis methodologies and conditions which can be applicable for the use of the methods of the disclosure, can be found in the following publications, which are incorporated herein by reference, Peng et al., ACS Nano 5 (2011) 4600-4606; Peng et al., Adv. Mater. 22 (2010) 5129-5133; Suh et al., Nat. Nano advance online publication (2017); Dusoe et al., Nano Lett. 17 (2017) 7416-7423.

In embodiments, each cycle of SIS can include, after exposing the nanoparticle precursor or nanoparticle infiltrated swelled block copolymer to the gaseous inorganic matrix material precursor, evacuating the gaseous inorganic matrix material precursor. In embodiments, each cycle of SIS can include, after exposing the nanoparticle precursor or nanoparticle infiltrated swelled block copolymer to the gaseous inorganic matrix material precursor, evacuating the gaseous inorganic matrix material precursor and introducing water vapor.

In various embodiments, the SIS cycle can include deposition of an inorganic matrix material from two or more gaseous inorganic matrix material precursors either simultaneously or sequentially to deposit a mixed composition matrix material and/or matrix material layers having distinct compositions.

In embodiments, the gaseous inorganic matrix material precursor can be any gaseous precursor suitable to be deposited as alumina, silica, titania, zinc oxide, or hafnia. The gaseous inorganic matrix material precursor can include a single gas or a mixture of gases. Reference herein will be made to a "gaseous inorganic matrix material precursor" and should be understood to include embodiments of a single gas as well as embodiments of a mixture of gasses. In embodiments, the gaseous inorganic matrix material precursor can include one or more of trimethyl aluminum, $AlBr_3$, $AlCl_3$, aluminum nitride, aluminum hydroxide, diethyl zinc, (N,N-dimethylamino)trimethylsilane, vinyltrimethoxysilane, trivinylmethoxysilane, tetrakis(dimethylamino)silane, tris (dimethylamino)silane (TDMAS), $TiCl_4$, titanium tetraisopropoxide (TTIP), and tetrakis(ethylmethylamino)hafnium. In embodiments, the gaseous inorganic matrix material precursor can include or is trimethyl aluminum.

In embodiments, the gaseous inorganic matrix material precursor can be doped with any dopant suitable to one of skill in the art. In embodiments, the dopant can include one or more of Cr, Nd, Er, Tm, and Yb. A variety of dopant compounds and combinations of dopants can be used based on the end use of the porous composite ceramic material.

In embodiments, the inorganic matrix can be formed using about 1 to about 30 cycles of SIS, or about 1 to about 25, or about 1 to about 20, or about 2 to about 15, or about 2 to about 10, or about 3 to about 8, or about 5 to about 8. For example, the inorganic matrix can be formed using about 1, 2, 3, 4, 5, 6, 7, 8, 9, 10, 15, 20, 25, or 30 cycles.

In embodiments, the gaseous inorganic matrix material precursor can be supplied at a pressure of about 0.1 mTorr to about 200 mTorr, or about 0.5 mTorr to about 150 mTorr, or about 1 mTorr to about 100 mTorr, or about 1 mTorr to about 50 mTorr, or about 2 mTorr to about 25 mTorr, or about 5 mTorr to about 15 mTorr. For example, the gaseous inorganic matrix material precursor can be supplied at a pressure of about 0.1 mTorr, 1 mTorr, 2 mTorr, 3 mTorr, 4 mTorr, 5 mTorr, 6 mTorr, 7 mTorr, 8 mTorr, 9 mTorr, 10 mTorr, 15 mTorr, 20 mTorr, 25 mTorr, 50 mTorr, or 100 mTorr.

In embodiments, exposing the nanoparticle precursor infiltrated swelled block copolymer to the gaseous inorganic matrix material precursor at a temperature of about 25° C. to about 200° C., or about 50° C. to about 150° C., or about 70° C. to about 120° C., or about 75° C. to about 105° C., or about 85° C. to about 95° C. For example, exposing the nanoparticle precursor infiltrated swelled block copolymer to the gaseous inorganic matrix material precursor at a temperature of 30° C., 40° C., 50° C., 60° C., 65° C., 70° C., 75° C., 80° C., 85° C., 90° C., 95° C., 100° C., 105° C., 110° C., 120° C., 130° C., 140° C., or 150° C.

In embodiments in which the polymer is removed by thermal annealing, the thermal annealing can be performed at a temperature of about 300° C. to about 700° C. In embodiments, the thermal annealing temperature can be about 300° C. to about 700° C., or about 350° C. to about 650° C., or about 400° C. to about 600° C., or about 425° C. to about 600° C., or about 450° C. to about 550° C. Advantageously, since the resulting ceramic materials have improved thermal stability, higher thermal annealing temperatures can be used without the adverse effect of sintering.

In embodiments, in which the polymer is removed by irradiating the inorganic matrix infiltrated swelled block copolymer with UV light in the presence of ozone, the irradiation can be for about 1 hour to about 24 hours, or about 3 hours to about 18 hours. The duration of irradiating can be dependent on the thickness of the inorganic matrix infiltrated swelled block copolymer. For example, an inorganic matrix infiltrated swelled block copolymer that has a thickness of about 200 nm thick can be irradiated for about 4 hours, or an inorganic matrix infiltrated swelled block copolymer that is about 250 nm to about 500 nm thick can be irradiated for at least about 10 hour to 15 hours.

In embodiments, in which removing the polymer includes exposing the inorganic matrix infiltrated swelled block copolymer to $O_2$ plasma, the exposure can include reactive ion etching. In embodiments, the reactive ion etching can include an etch rate in the range of about 30 nm/minute to about 80 nm/minute, or about 40 nm/minute to about 70 nm/minute, or about 50 nm/minute to about 60 nm/minute. For example, the ion etch rate can be about 30 nm/minute, 40 nm/minute, 50 nm/minute, 60 nm/minute, 70 nm/minute, or 80 nm/minute. In embodiments, the reactive ion etching can include a power of about 50 W to about 300 W, or about 100 W to about 200 W. For example, the power can be about 50 W, 75 W, 100 W, 150 W, 200 W, 250 W, or 300 W.

The porous composite ceramic materials as made by methods disclosed herein can advantageously have a significantly porous structure. In embodiments, the porous composite ceramic materials can have a porosity of about 0% to about 90%, or about 5% to about 80%, or about 20% to about 60%, or about 30% to about 50%. In embodiments, the porous composite ceramic material can advantageously include pores that are interconnected and/or pores that have no particular directionality, in other words, the pores can be in any and all directions. In embodiments, as pore interconnectivity increases in the porous composite ceramic material, access of the reactant, such as carbon monoxide and methane, to nanoparticles increases, thereby allowing for higher catalytic activity and/or higher catalytic efficiency.

In embodiments, a porous composite ceramic material as prepared by the methods described herein can be used as a catalyst. In embodiments, the porous composite ceramic material as prepared by the methods described herein can be used as a catalyst in hydrocarbon combustion reactions, volatile organic compound oxidation, methane oxidation, and carbon monoxide oxidation. In embodiments, the hydrocarbon combustion reaction can include methane, ethane, propane, ethylene, propylene, or the like. In embodiments, the volatile organic compound oxidation can include aromatic compounds such as benzene or toluene, halogenated hydrocarbons, aldehydes, alcohols, ketones, and ethers. Examples of volatile organic compound oxidation compounds and conditions, which can be applicable for the use of the use of the porous composite ceramic material of the disclosure, can be found in the following publications, which are incorporated herein by reference, Kamal et al., Atmospheric Environment, 140 (2016) 117-134. For example, the methods disclosed herein can be used to prepare a porous composite ceramic material capable of catalyzing methane oxidation or carbon monoxide oxidation.

In embodiments, the porous composite ceramic material as prepared by the methods described herein can be used a sensor. In embodiments, the porous composite ceramic material can be a sensor for sensing applications in both the gas phase and in solution. In embodiments, the porous composite ceramic material can be a sensor for sensing applications for the sensing of one or more of methane, carbon monoxide, acetone, ethylene, methanol, and water.

In embodiments, the porous composite ceramic material as prepared by the methods described herein can be incorporated into a filtration system. In embodiments, the porous composite ceramic material as prepared by the methods described herein can be used in a water filtration system. For example, the porous composite ceramic material as prepared by the methods described herein can include nanoparticles, such as iron oxide nanoparticles, that can bind chemicals in water, such as arsenic.

In embodiments, the porous composite ceramic material can include nanoparticles in an amount of about 0.1 wt % based on the total weight of ceramic material, or about 0.5 wt %, or about 1 wt %, or about 2 wt %, 3 wt %, 4 wt %, 5 wt %, 6 wt %, 7 wt %, 8 wt %, 9 wt %, 10 wt %, 12 wt %, 15 wt %, 20 wt %, 30 wt %, 40 wt %, or 50 wt %.

In embodiments, a porous composite ceramic material can include nanoparticles in alumina.

EXAMPLES

In the examples below, characterization of the resulting porous composite ceramic materials and intermediate materials formed during the processed were characterized using the following techniques. Quartz crystal microbalance (QCM) technique was used for the quantitative analysis of the materials infiltration during both the swelling of the block copolymer in the solvent with dissolved nanoparticle precursor and during the sequential infiltration synthesis. 3 wt % solution of PS-b-P4VP polymer in toluene was spin-coated on AT-cut QCM crystals (resonant frequency ~5 MHz) with titanium-coated electrodes to produce a thin uniform film of thickness ~200 nm. The change in the resonant frequency and mechanical resistance of the QCM fixed in a specifically designed Teflon holder during different stages of the process was monitored using SRS QCM200 system. Change in the resonant frequency of the QCM oscillations allowed for judgment of the changes in the mass of the polymer film and, based on this, the amount of material infiltrated was estimated (Berman et al., Thin Solid Films, 520 (2012) 6201-6206).

AFM measurements were performed to evaluate the changes in the morphology of the PS-b-P4VP polymer during swelling in ethanol with and without $Pd(acac)_2$ precursor added. The samples were dried after the swelling under the fume hood for 2 hours prior to the measurements. For this purpose, the images were acquired by an AFM Veeco Microscope at ambient air conditions (relative humidity ~30%) using a silicon tip with k ~0.3 N/m (provided by Ted Pella Inc.) in contact mode. The height profile measurements were performed for the area of 1 μm×1 μm with the scanning speed of 1 Hz (1 μm/s scanning speed).

Transmission electron microscopy (TEM) analysis was performed using either a JEOL 2100F microscope or an FEI Tecnai operating at 200 kV on the samples crushed and deposited on the carbon mesh TEM grid. Chemical modification of the polymers during swelling and SIS were evaluated using a Nicolet 6700 Fourier Transformation Infrared spectrometer (FTIR) with 1000-4000 $cm^{-1}$ spectral range.

Example 1

Samples of palladium oxide nanoparticles, or ruthenium oxide nanoparticles, or cobalt oxide nanoparticles infiltrated in the amorphous alumina matrix were synthesized using two stages of the infiltration process. Polystyrene-block-polyvinyl pyridine (PS-b-P4VP) polymer powders with molar weight 75 k-b-25 k were purchased from Polymer Source Inc. The powders were dissolved in toluene at 3 wt % concentration following two steps of filtration through 0.4 μm and 0.2 μm sized filters to remove any large agglomerates. In order to receive large amounts of the samples, a paper filter (Whatman, Grade 1) as a support matrix for the polymer template was used during the swelling and infiltration steps. Paper filters were immersed inside the polymer solution and exposed to 30 minutes of sonication to absorb the polymer inside the cellulose matrix. The paper filters with block copolymer absorbed therein were dried afterward using a hot plate at 100° C. for an hour.

A swelling solution containing palladium acetylacetonate, $Pd(C_5H_7O_2)_2$ (also referred to more simply $Pd(acac)_2$), or ruthenium acetylacetonate, or cobalt acetylacetonate, as a nanoparticle precursor at a 1 wt % concentration in ethanol was used to initiate swelling-based infiltration of the material inside the polar polymer domains selective to swelling in ethanol. For this, the paper filters having the block copolymer absorbed therein were immersed in the nanoparticle precursor swelling solution and heated to 75° C. for 1 hour. The temperature of the swelling was selected based on the higher swelling rates of the polymer at such elevated temperature. After 1 hour, the nanoparticle precursor infiltrated swelled block copolymer samples were carefully removed from the solution and dried in the fume hood at room temperature for at least 2-3 hours. The low temperature of drying was used to prevent the collapse of the swelling-introduced porosity in the polymers.

Next, infiltration of alumina in the polymer was performed using sequential infiltration synthesis in an atomic layer deposition system. The nanoparticle precursor infiltrated swelled block copolymer samples were exposed to 5 cycles of trimethylaluminum (TMA) as a gaseous inorganic matrix material precursor and water exposure. The samples were placed on a stainless steel tray inside the ALD chamber at 90° C. to avoid melting of swelling-formed predefined polymer structures. 100 sccm nitrogen flow was introduced to the chamber for 30 minutes prior to the infiltration. One SIS cycle was performed as: 10 mTorr of the TMA precursor was admitted with 20 sccm nitrogen flow into the reactor for 400 s; after the predetermined time when the infiltration of the polymer occurs the excess of the reactant was evacuated and followed by admitting of 10 mTorr of $H_2O$ for 120 s; the chamber was then purged with 100 sccm of nitrogen to remove not-infiltrated byproducts.

Figure 1B:
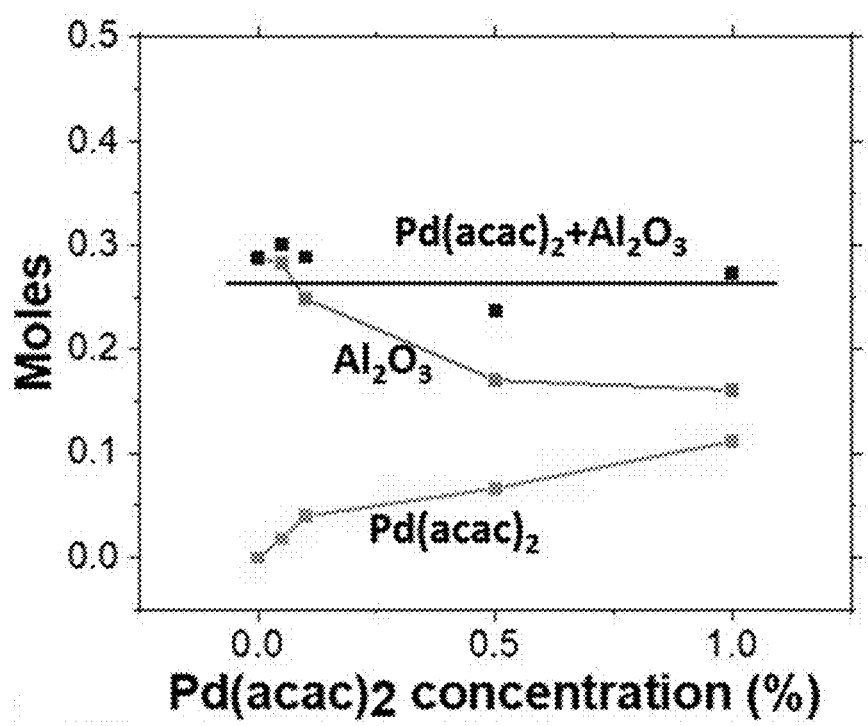
FIG. 1B is a graph showing a mass change normalized per molar mass of the infiltration material in accordance with embodiments of the disclosure.
Figure 1C:
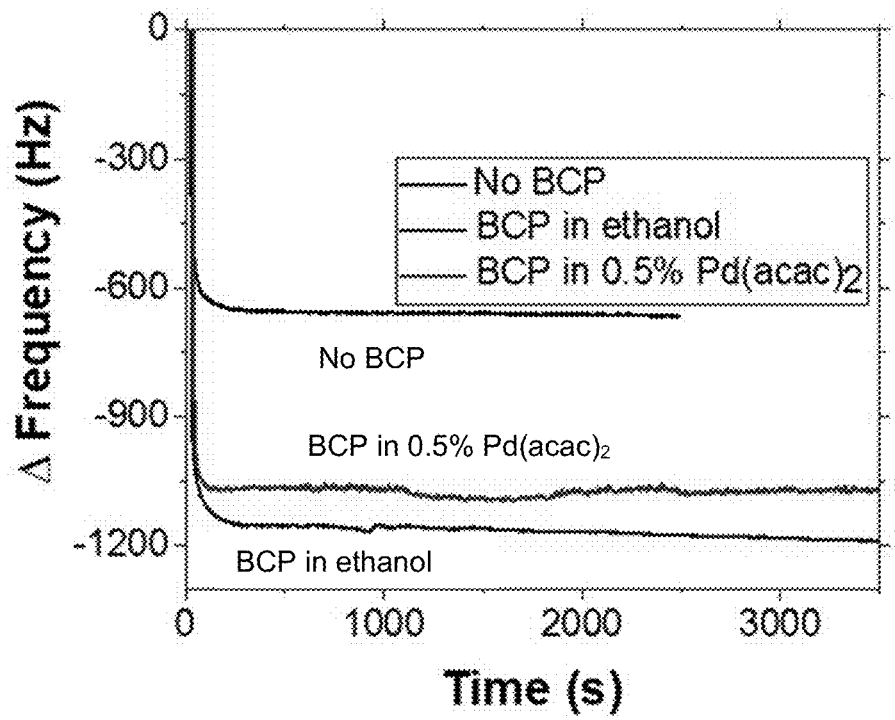
FIG. 1C is a graph showing a delta frequency change during the $Pd(acac)_2$ in ethanol infiltration (0.5% concentration was selected), in accordance with embodiments of the disclosure.
Figure 1D:
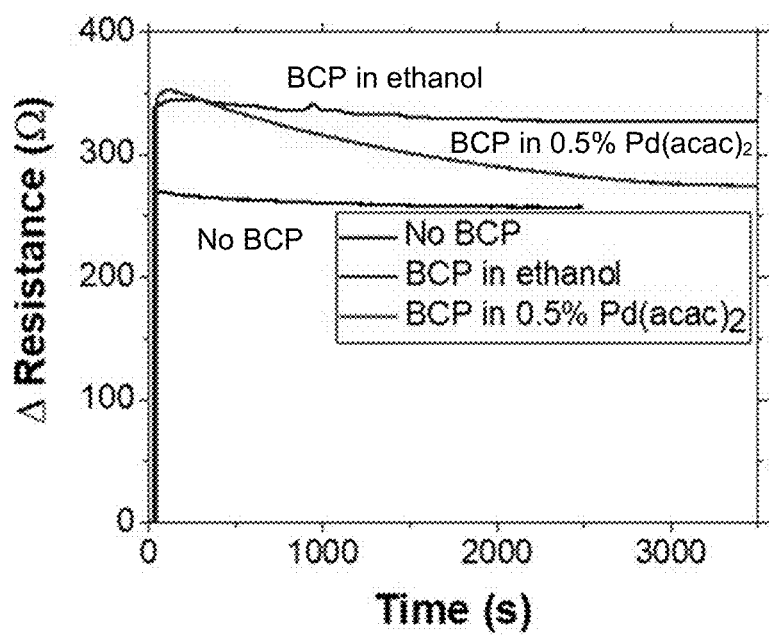
FIG. 1D is a graph showing the delta mechanical resistance change during the $Pd(acac)_2$ in ethanol infiltration (0.5% concentration was selected), in accordance with embodiments of the disclosure.

After the inorganic matrix material infiltration, the polymer template was removed by burning at 450° C. in oxygen flow using the ThermoFisher tube furnace. Additional tested polymer removal procedures included UV ozone cleaner and burning at a higher temperature of 600° C. High temperature annealing also enabled complete removal of the paper filter for the ensuing catalytic activity analysis. In order to understand the correlation between the concentration of the nanoparticle precursor in the swelling solution and the final nanoparticle concentration in the ceramic matrix, the above method was repeated with various concentrations of $Pd(acac)_2$ in the swelling solution. In particular, porous composite ceramic materials were made using the following different concentrations of $Pd(acac)_2$ in ethanol: 0.05 wt %, 0.1 wt %, 0.5 wt %, and 1 wt %, based on the total weight of the ethanol solvent. 1 wt % was used as an upper limit, as further increase in the concentration of $Pd(acac)_2$ was limited by its dissolution in ethanol. The mass increase during the $Pd(acac)_2$ infiltration and during SIS was analyzed using QCM technique (FIG. 1A-D) since this technique captures dynamics of the coating evaluation and quantitatively characterizes small changes of the film mass. A higher concentration of $Pd(acac)_2$ in ethanol resulted in a larger adsorbed amount (FIG. 1A). Also, QCM data showed that alumina infiltration capacity is significantly affected by the adsorption of the $Pd(acac)_2$ suggesting that the reactive sites for TMA adsorption and for SBI are similar. Changes in the frequency and mechanical resistance of the QCM oscillations (FIGS. 1B and 1C correspondingly) during swelling-induced infiltration indicated that while swollen with ethanol, the block copolymer exhibited viscous-like behavior leading to higher mechanical resistance of the oscillations, infiltration of $Pd(acac)_2$ mechanically strengthens the polymer leading to a decrease in delta resistance over time. Based on the results, it was determined that a 0.5 wt % concentration of the $Pd(acac)_2$ should result in ~10 wt % of the palladium concentration in resulting alumina after conversion of $Pd(acac)_2$ into PdO.

Detailed FTIR analysis of the infiltration stages was performed to identify the reactive sites for the swelling-induced and SIS infiltration stages. The swelling in ethanol only increased absorption for CH bending of $CH_3$ and $CH_2$ compounds at 1580, 1500, 1450, and 1410 $cm^{-1}$; these $CH_x$ compounds are indicated as the major sites for alumina growth (She et al., ACS Omega 2 (2017) 7812-7819). However, when $Pd(acac)_2$ was added to ethanol to enable infiltration of the polymer with it, the major changes were the absence of absorbance peak at ~3050 $cm^{-1}$ and absorbance reduction at 1610 $cm^{-1}$, suggesting that $Pd(acac)_2$ suppressed stretching $CH_2$ bonds and led to formation of C=C bonds. Additionally, absorbance peaks rising in the range of 1665-1750 $cm^{-1}$ indicated the presence of ketone functional groups from acetylacetonate adsorption. Reduction of the intensity of ketone peaks after SIS indicated that $Pd(acac)_2$ undergoes partial hydrolysis upon reacting with water vapors. Formation of PdO was fully completed after polymer removal in oxygen-rich atmosphere, either with thermal annealing or under UV ozone cleaning conditions.

After the infiltration steps, the polymer template and residual organic material were removed using thermally-assisted burning in an oxygen atmosphere and using UV ozone cleaning procedure. The resulting samples were analyzed with transmission electron microscopy (TEM), which are shown in FIGS. 2A-2B, 3A-3B, and 4A-4B. The dark spots are the PdO NPs inside the lighted amorphous alumina matrix. The three different block copolymer removal processes demonstrate changes in the size of the nanoparticles as seen in the images.

Figure 2A:
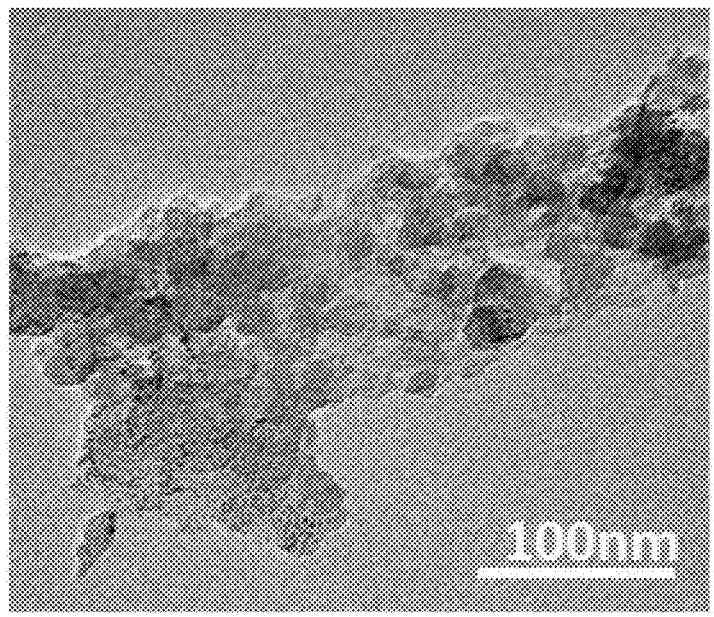
FIG. 2A is a transition electron microscope (TEM) image on a 100 nm scale of a porous composite ceramic material in accordance with embodiments of the disclosure, after removing the block copolymer by irradiating the inorganic matrix infiltrated swelled block copolymer with UV light in the presence of ozone.
Figure 2B:
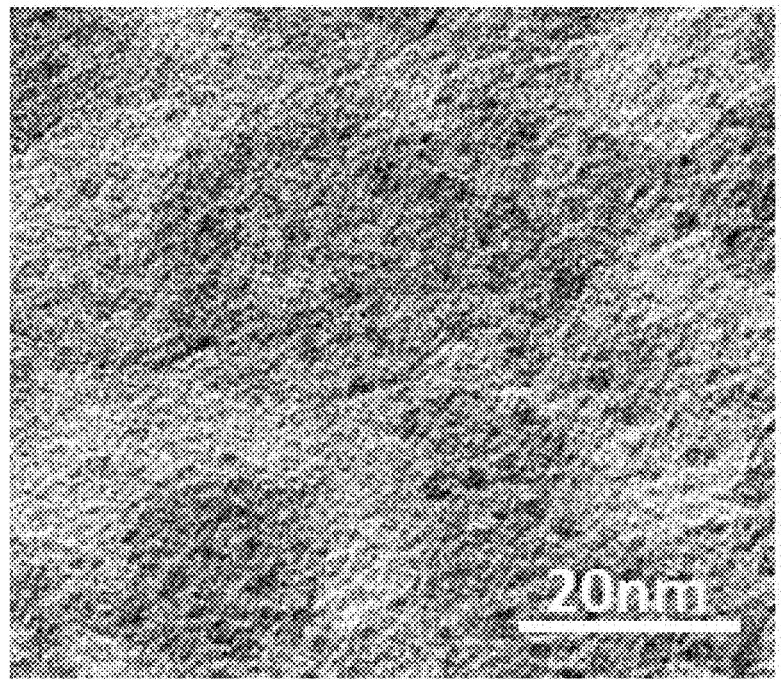
FIG. 2B is a transition electron microscope (TEM) image on a 20 nm scale of a porous composite ceramic material in accordance with embodiments of the disclosure, after removing the block copolymer by irradiating the inorganic matrix infiltrated swelled block copolymer with UV light in the presence of ozone.
Figure 2C:
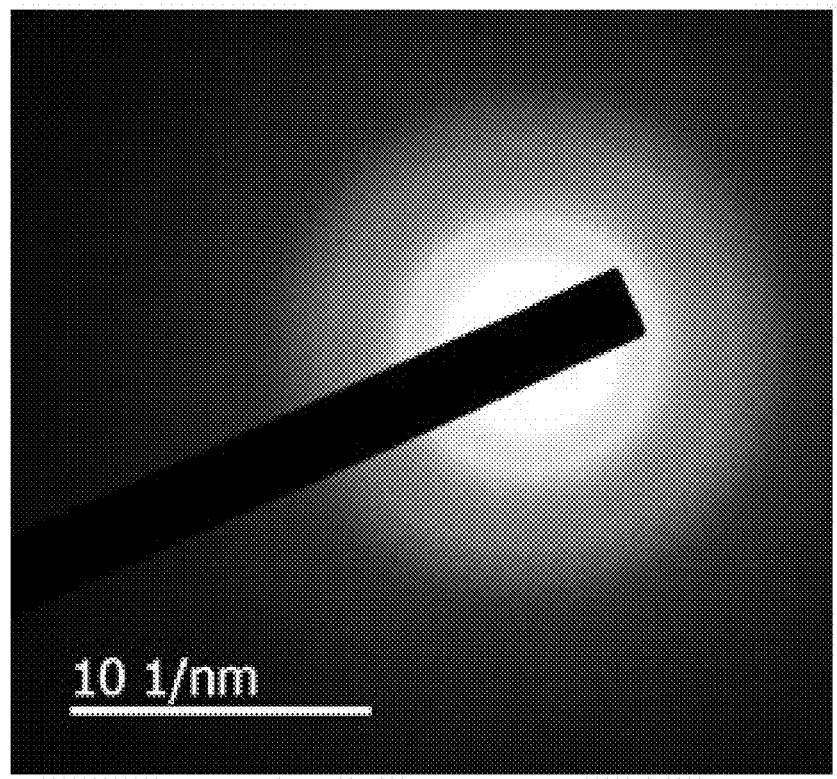
FIG. 2C is an electron diffraction pattern of a porous composite ceramic material in accordance with embodiments of the disclosure, after removing the block copolymer by irradiating the inorganic matrix infiltrated swelled block copolymer with UV light in the presence of ozone.
Figure 3A:
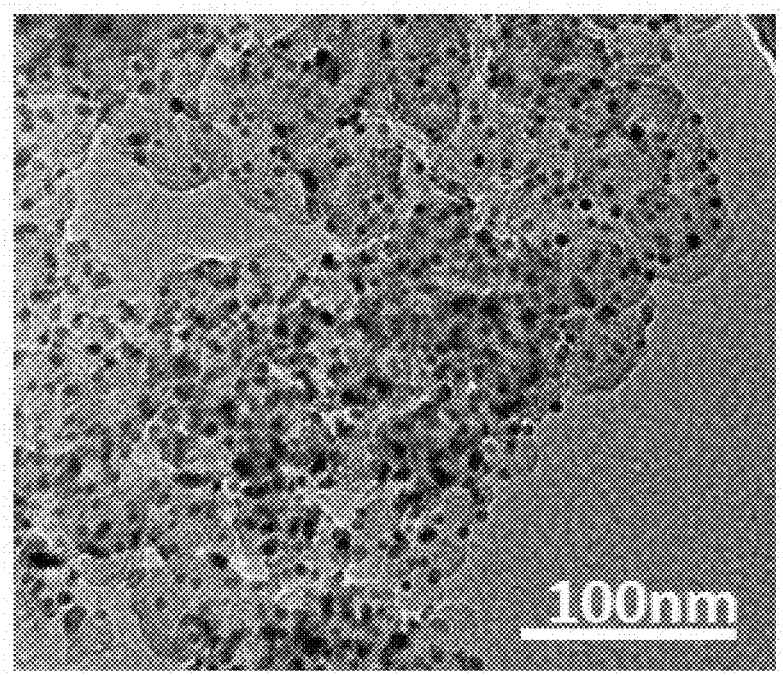
FIG. 3A is a transition electron microscope (TEM) image on a 100 nm scale of a porous composite ceramic material in accordance with embodiments of the disclosure, after removal of the block copolymer by thermally annealing the inorganic matrix infiltrated swelled block copolymer in the presence of oxygen at a temperature of 450° C.
Figure 3B:
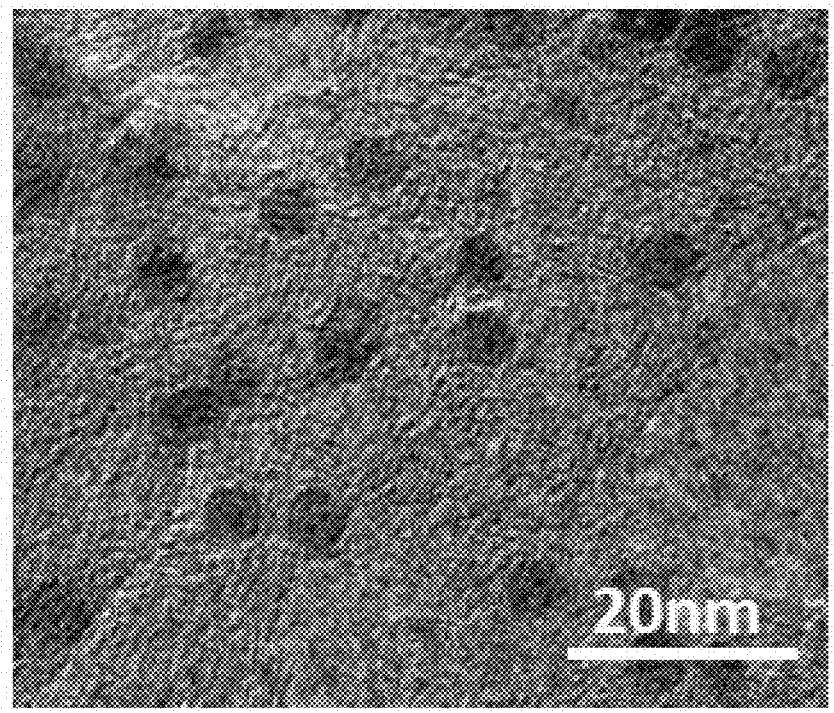
FIG. 3B is a transition electron microscope (TEM) image on a 20 nm scale of a porous composite ceramic material in accordance with embodiments of the disclosure, after removal of the block copolymer by thermally annealing the inorganic matrix infiltrated swelled block copolymer in the presence of oxygen at a temperature of 450° C.
Figure 3C:
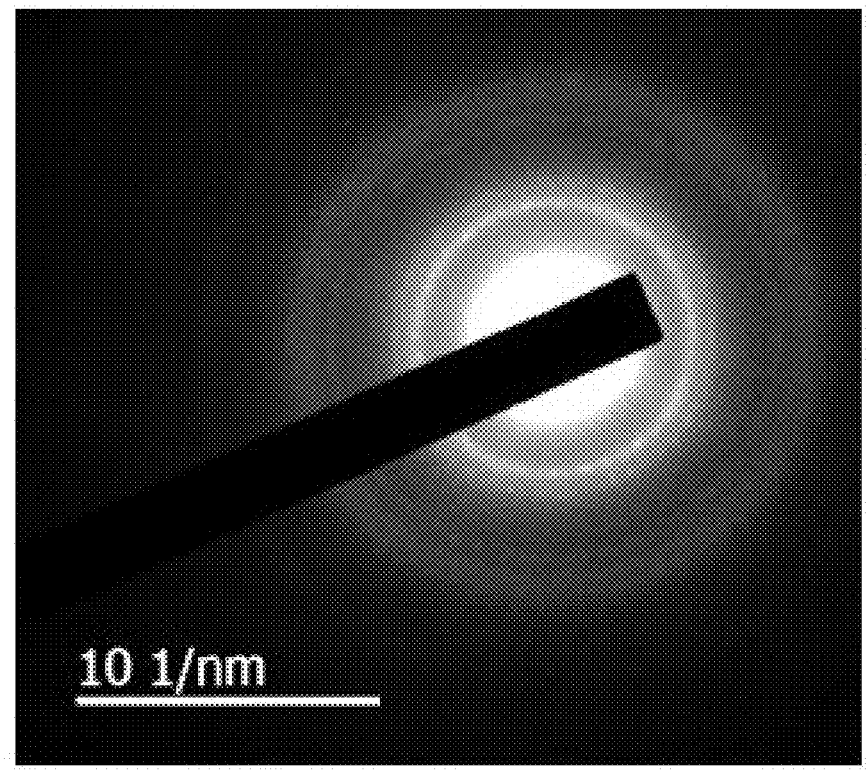
FIG. 3C is an electron diffraction pattern of a porous composite ceramic material in accordance with embodiments of the disclosure, after removing the block copolymer by thermally annealing the inorganic matrix infiltrated swelled block copolymer in the presence of oxygen at a temperature of 450° C.
Figure 4A:
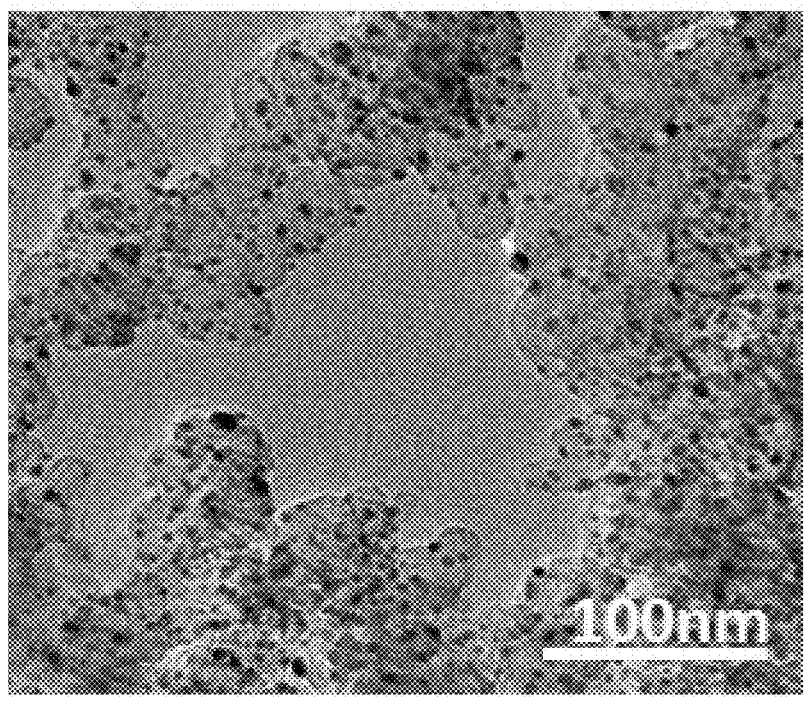
FIG. 4A is a transition electron microscope (TEM) image on a 100 nm scale of a porous composite ceramic material in accordance with embodiments of the disclosure, after removal of the block copolymer by thermally annealing the inorganic matrix infiltrated swelled block copolymer in the presence of oxygen at a temperature of 600° C.
Figure 4B:
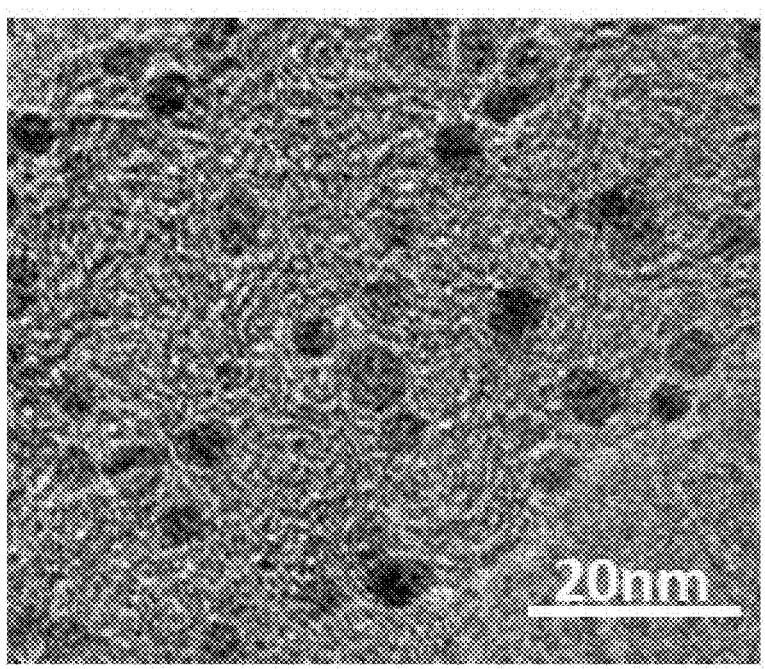
FIG. 4B is a transition electron microscope (TEM) image on a 20 nm scale of a porous composite ceramic material in accordance with embodiments of the disclosure, after removal of the block copolymer by thermally annealing the inorganic matrix infiltrated swelled block copolymer in the presence of oxygen at a temperature of 600° C.
Figure 4C:
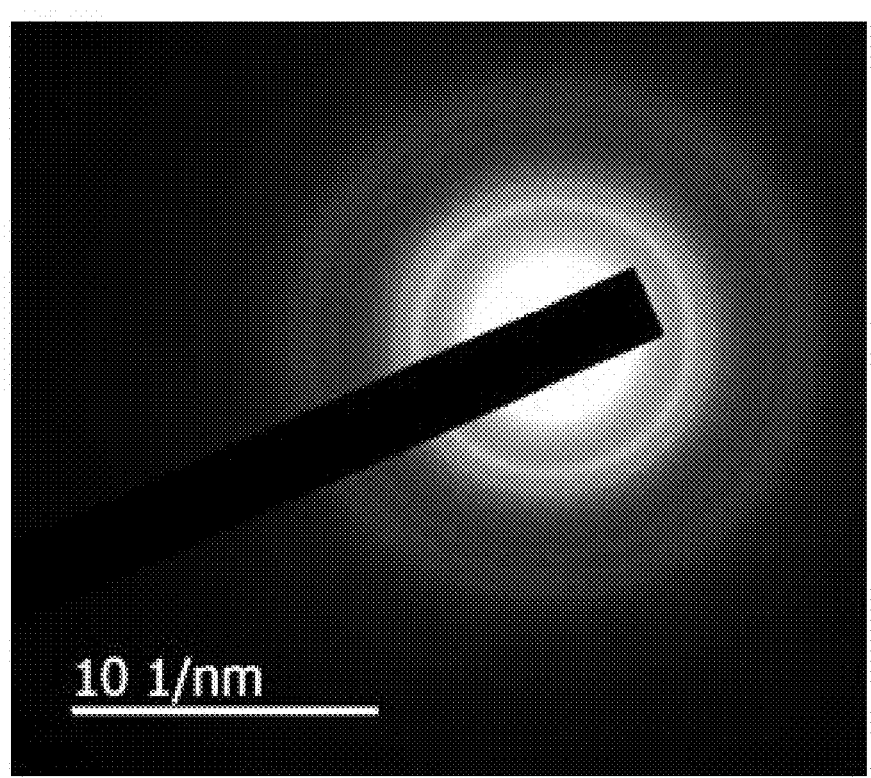
FIG. 4C is an electron diffraction pattern of a porous composite ceramic material in accordance with embodiments of the disclosure, after removing the block copolymer by thermally annealing the inorganic matrix infiltrated swelled block copolymer in the presence of oxygen at a temperature of 600° C.

The removal of the polymer template by UV at room temperature resulted in the formation of smaller NPs uniformly distributed in the alumina matrix (FIG. 2A-2B). Thermally-assisted removal of the polymer led to the formation of larger size nanoparticles. A further increase in temperature up to 600° C. did not affect the size distribution of NPs, suggesting that the alumina matrix prevents further diffusion of material. Electron diffraction analysis of the samples (FIGS. 2C, 3C, and 4C) confirmed the amorphous nature of alumina matrix and revealed a cubic crystalline structure of synthesized NPs after annealing at 450° C. and 600° C. The structure remained stable after annealing up to 600° C. XPS analysis of the samples indicated the full conversion of $Pd(acac)_2$ into PdO NPs during the infiltration steps as captured from the Pd 3-dimensional detailed scan. As indicated from QCM analysis (FIG. 1A-D), the mass gained during $Pd(acac)_2$ and TMA+water infiltration are similar. However, burning of the polymer film and removal of the polymer resulted in substantial lowering of the palladium compound mass due to the removal of the acetylacetonate groups. Presence of both Pd and PdO peaks in XPS results and well-defined electron diffraction pattern matching fcc Pd structure suggested that resulting NPs were synthesized in the form of crystalline Pd surrounded by amorphous PdO shell. This was also confirmed by ED data that revealed a cubic crystalline structure of the Pd.

The resulting porous composite ceramic materials including ruthenium oxide nanoparticles or cobalt oxide nanoparticles were analyzed with transmission electron microscopy (TEM), which are shown in FIGS. 8A-8B and FIGS. 9A-9B. The dark spots are the ruthenium oxide NPs or cobalt oxide NPs inside the lighted amorphous alumina matrix. The methods of the disclosure open a new pathway for design of multicomponent functional material systems. Using the two-step infiltration method, the successful design of cobalt oxide NPs and ruthenium oxide NPs in alumina matrix was demonstrated as well as PdO NPs.

Example 2

A porous composite ceramic material was made using a method of the disclosure in which preformed nanoparticles were utilized in the swelling solution as opposed to nanoparticle precursor. In particular, a porous composite ceramic material of alumina infiltrated with preformed PdO NPs prepared. The block copolymer was dissolved in toluene in a 1-10 wt % concentration. The PdO nanoparticles were mixed with the block copolymer in the toluene solution by sonicating the mixture for 30 minutes. In order to receive large amounts of the samples, a paper filter (Whatman, Grade 1) as a support matrix for the polymer template was used during the swelling and infiltration steps. Paper filters were immersed inside the polymer and nanoparticle solution and exposed to 30 minutes of sonication to absorb the polymer and nanoparticle inside the cellulose matrix. The paper filters with block copolymer and nanoparticles absorbed therein were dried afterward using a hot plate at 100° C. for an hour.

A swelling solution containing ethanol was used to initiate swelling-based infiltration of the material. For this, the paper filters having the block copolymer and nanoparticles absorbed therein were immersed in the swelling solution and heated to 75° C. for 1 hour. The temperature of the swelling was selected based on the higher swelling rates of the polymer at such elevated temperature. After 1 hour, the nanoparticle infiltrated swelled block copolymer samples were carefully removed from the solution and dried in the fume hood at room temperature for at least 2-3 hours. The low temperature of drying was used to prevent the collapse of the swelling-introduced porosity in the polymers.

Next, infiltration of alumina in the polymer was performed using sequential infiltration synthesis in an atomic layer deposition system. The nanoparticle infiltrated swelled block copolymer samples were exposed to 5 cycles of trimethylaluminum (TMA) as a gaseous inorganic matrix material precursor and water exposure. The samples were placed on a stainless steel tray inside the ALD chamber at 90° C. to avoid melting of swelling-formed predefined polymer structures. 100 sccm nitrogen flow was introduced to the chamber for 30 minutes prior to the infiltration. One SIS cycle was performed as: 10 mTorr of the TMA precursor was admitted with 20 sccm nitrogen flow into the reactor for 400 s; after the predetermined time when the infiltration of the polymer occurs the excess of the reactant was evacuated and followed by admitting of 10 mTorr of $H_2O$ for 120 s; the chamber was then purged with 100 sccm of nitrogen to remove not-infiltrated byproducts.

After the inorganic matrix material infiltration, the polymer template was removed by burning at 450° C. in oxygen flow using the ThermoFisher tube furnace.

Figure 6A:
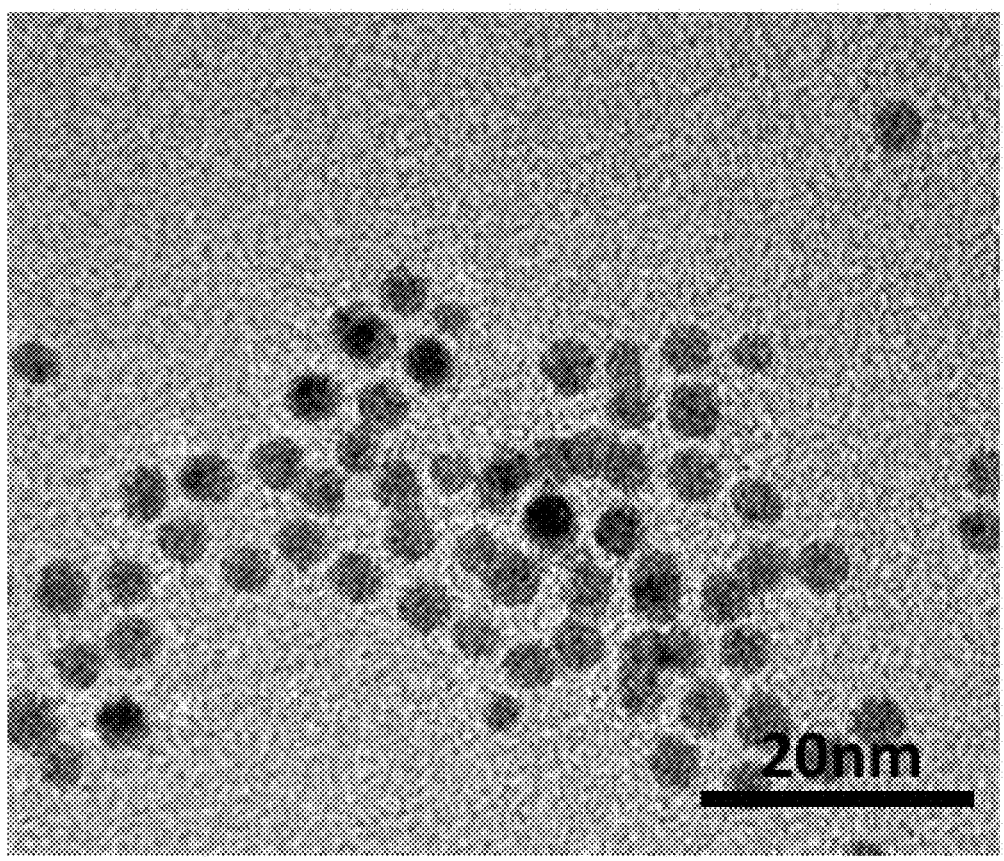
FIG. 6A is a TEM image of PdO NPs before incorporation in the alumina matrix by methods in accordance with embodiments of the disclosure.
Figure 6B:
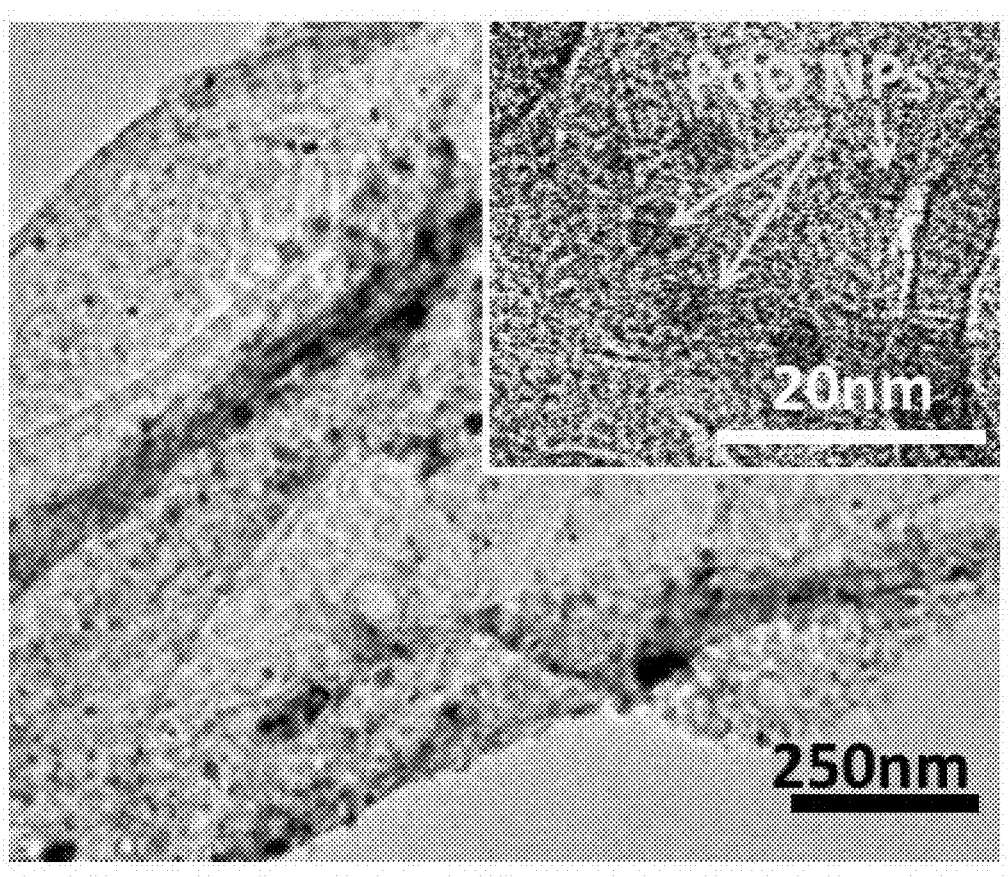
FIG. 6B is a TEM image of PdO NPs after incorporation in the alumina matrix, by methods in accordance with embodiments of the disclosure.
Figure 6C:
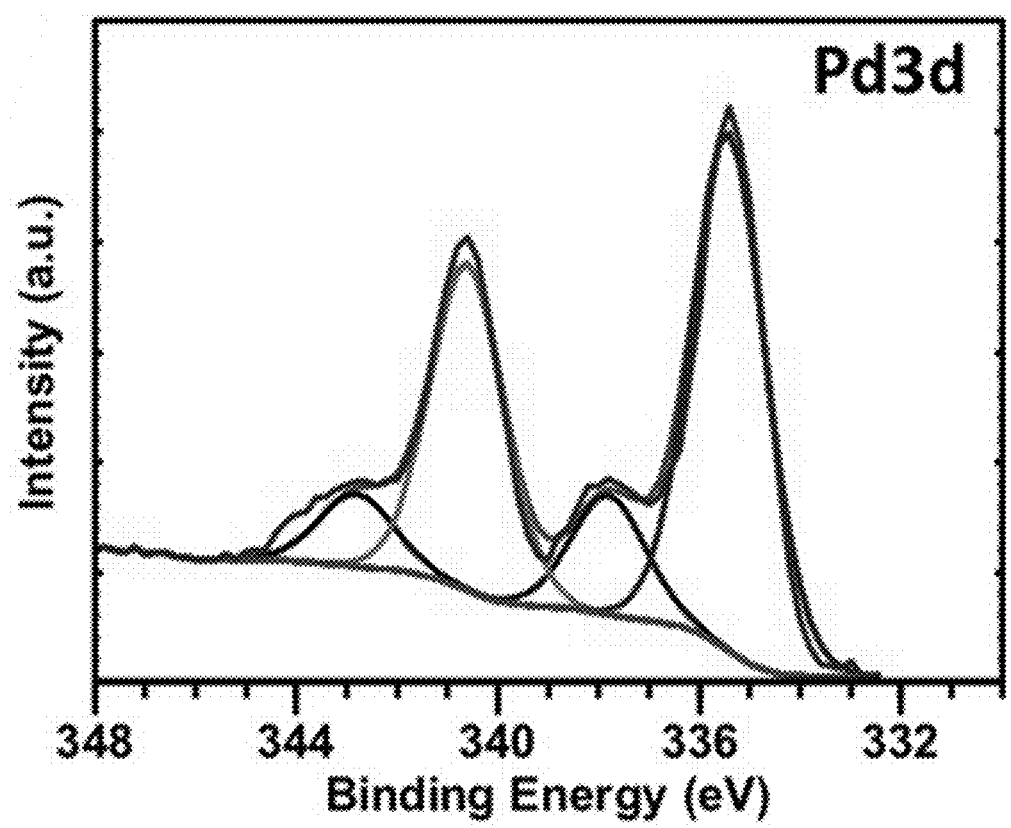
FIG. 6C is a graph showing x-ray photoelectron spectroscopy (XPS) data of PdO NPs before incorporation in the alumina matrix by methods in accordance with embodiments of the disclosure.
Figure 6D:
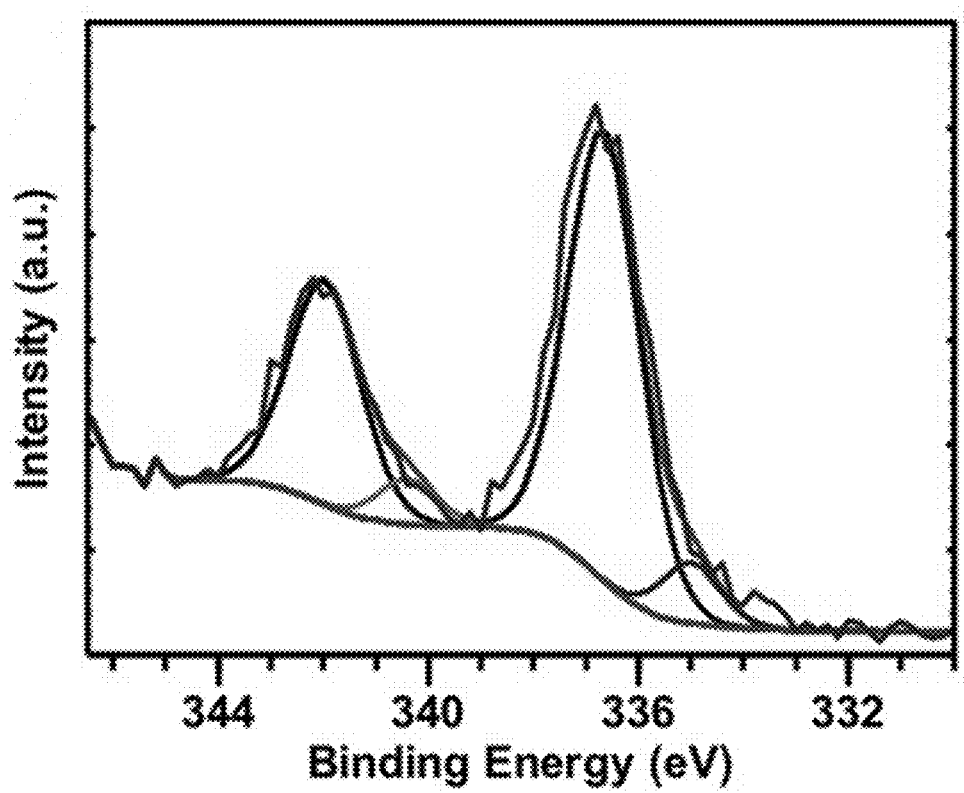
FIG. 6D is a graph showing XPS data of PdO NPs after incorporation in the alumina matrix by methods in accordance with embodiments of the disclosure.

It was observed that since PdO NPs were initially distributed in polystyrene, which does not react with TMA in the SIS process, the interfacing of NPs and alumina took place upon removal of the block copolymer by thermally annealing at elevated temperature (450° C.). As a result, some agglomeration of NPs took place as it is evidenced by rather broad NP size distribution observed after annealing (FIG. 6B). Agglomeration may be suppressed with reduced loading of the NPs. The XPS data (FIG. 6C-6D) suggested the oxidation of PdO nanoparticles in the composite ceramic occurred during the oxidative removal of the polymer.

In terms of the redox states, Pd-based heterostructures obtained by the adsorption of $Pd(acac)_2$ and by direct introduction of PdO nanoparticle are similar. TEM analysis of PdO nanoparticles was taken before (FIG. 6A) and after incorporation in alumina matrix (FIG. 6B). Inset in FIG. 6B shows higher magnification indicating no agglomeration of the NPs at 1% loading.

As demonstrated in Example 3, the porous composite materials of this example also revealed good catalytic activity in $CH_4$ and CO oxidation reactions. Importantly, no additional sintering of NPs was found after catalytic tests.

Example 3—Catalytic Activity

In order to estimate the stability of the structures and accessibility of porous composite ceramic materials in accordance with the disclosure, Pd/PdO NPs in alumina matrix synthesized using the method described in example 1, using a nanoparticle precursor amount of 0.5 wt % in the swelling solution. Catalytic performance was tested in CO oxidation and methane ($CH_4$) combustion reactions in which Pd is known to demonstrate catalytic activity. The catalytic results, reported in terms of light-off curves (FIG. 5A-5C), demonstrated that the method of the disclosure can be used to create porous structures with embedded catalysts for emission control reactions.

A catalyst bed was prepared in a U-shaped quartz microreactor with an internal diameter of 10 mm. The bed was prepared by cutting the porous composite ceramic material approximately into quarters, which rested in between 100 mg layers of calcined $Al_2O_3$, all of which rested in between two layers of calcined and acid-cleaned granular quartz (quartz/$Al_2O_3$/porous composite ceramic material/$Al_2O_3$/quartz). In a control experiment to check for hot spots, no differences were observed whether the porous composite ceramic material was sliced into quarters or finely ground into pieces that were directly mixed with the $Al_2O_3$ diluent. The reactor was heated by a square furnace (Micromeritics) and the temperature of the catalyst was measured with a K-type thermocouple inserted inside the reactor, touching the catalytic bed. All experiments were conducted at a total pressure of one atmosphere.

The reactant mixture composition was controlled by varying the flow rates of $CH_4(5\%)$/Ar, $O_2(5\%)$/Ar, $CO(5\%)$/Ar and Ar (all certified mixtures with purity >99.999% from Airgas). The following procedure represents standard reaction conditions. With no in-situ pretreatment unless stated. Reaction gas mixtures were first stabilized while the catalyst was held under a 20 mL min$^{-1}$ flow of pure Ar, at which point they were then introduced into the reactor. Ramping from room temperature to 275° C. at 5° C. min$^{-1}$, CO oxidation ignition curves were performed with 0.5% CO, 4.0% $O_2$, and 95.5% Ar, at a total flow rate of 20 mL min$^{-1}$. Next, at 275° C. the reactor was switched to Ar flow at 20 mL min$^{-1}$ as $CH_4$ oxidation gases stabilized, with 0.5% $CH_4$, 4.0% $O_2$, and 95.5% Ar, at a total flow rate of 20 mL min$^{-1}$. At that point, the reaction gases were introduced to the catalyst bed and the catalyst was ramped from 275° C. to 575° C. at 10° C. min$^{-1}$. Finally, the reactor was cooled down from 575° C. to room temperature (rt) at ~50° C./min under 20 mL/min flowing Ar in order to preserve the catalyst state and structure under operating conditions. For effects of pretreatment temperature and environment on CO oxidation and $CH_4$ combustion reactions, experiments were done sequentially with stated in-situ pretreatments in between catalytic tests. For all experiments, reactor effluent was measured using an online mass spectrometer (Hiden HPR-20).

Figure 5A:
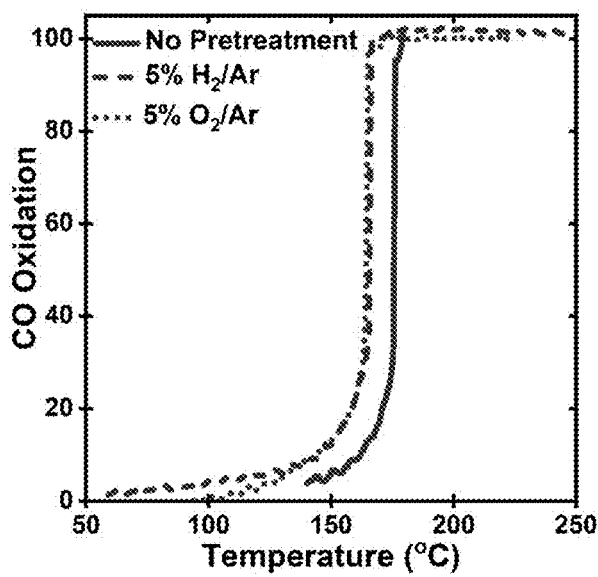
FIG. 5A is a graph showing the catalytic activity of a porous composite ceramic material with ~10% of swelling-based infiltration PdO NPs in alumina for CO oxidation, wherein the gas was 0.5% CO, 4.0% $O_2$, 95.5% Ar at 20 mL/min and the total Ramp was from r.t. to 275° C. at 5° C./min.
Figure 5B:
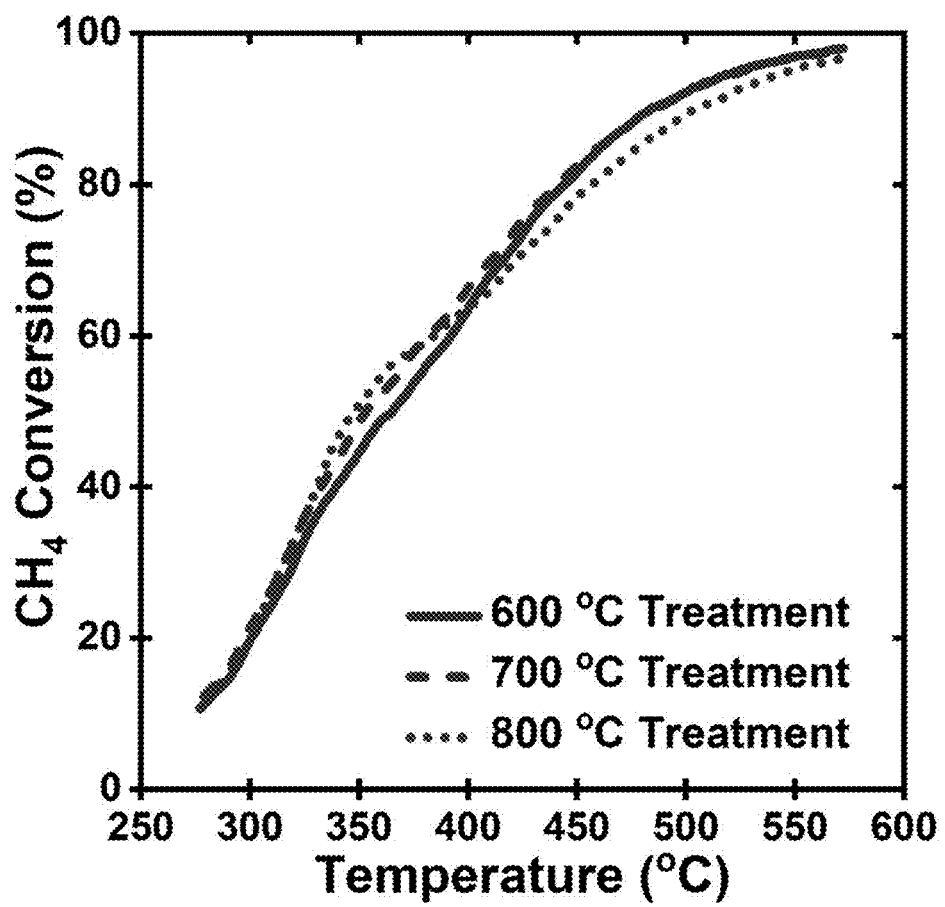
FIG. 5B is a graph showing the catalytic activity of the samples with ~10% of SBI PdO NPs in alumina for $CH_4$ oxidation, wherein the gas was 0.5% $CH_4$, 4.0% $O_2$, 95.5% Ar at 20 mL/min and the total Ramp was from 275° C. to 575° C. at 10° C./min. Pretreatments of the samples were performed for 1 hour at 600° C., 700° C., and 800° C.
Figure 5C:
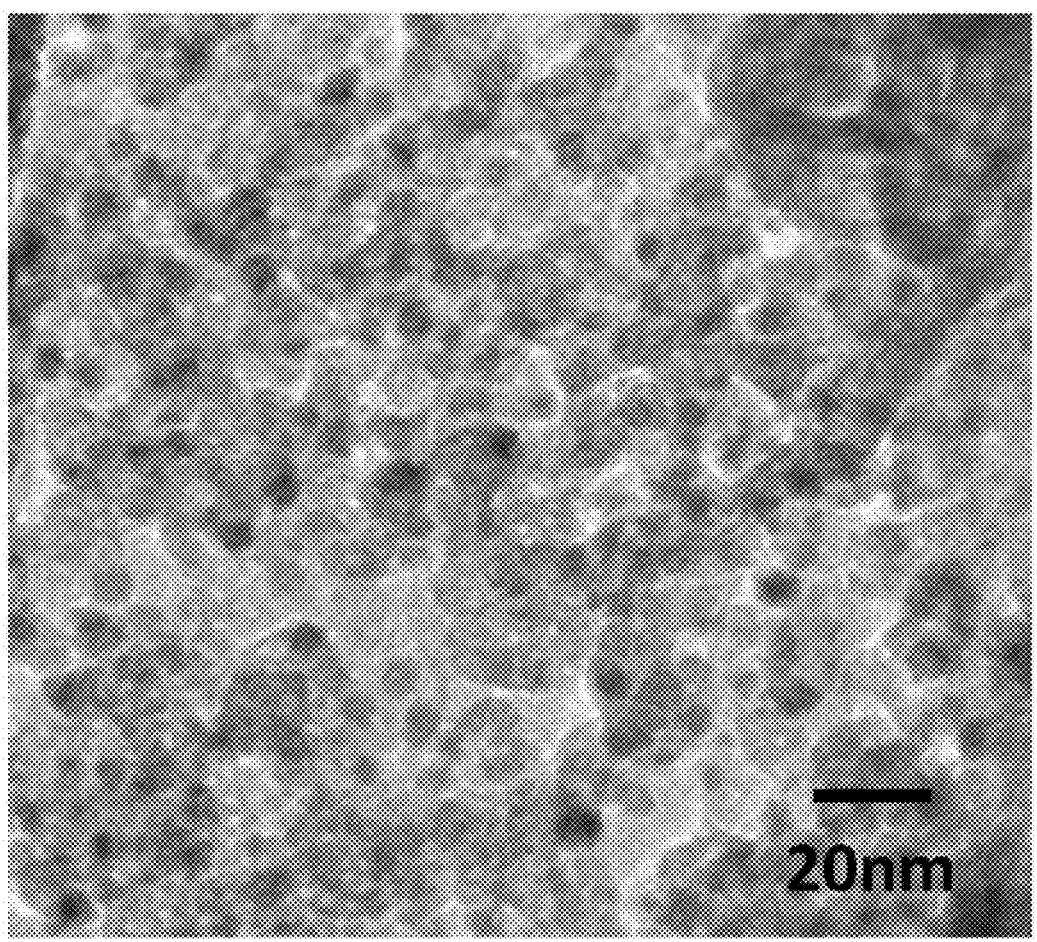
FIG. 5C is a transition electron microscope (TEM) image of a porous composite ceramic material in accordance with embodiments of the disclosure after pre-treatment at 800° C. followed by the methane combustion reaction tests.

In the case of CO oxidation (FIG. 5A), the samples without pretreatment demonstrated complete CO oxidation by ~180° C., while pretreatment in both oxygen and hydrogen-containing atmospheres lowered the complete oxidation temperature to ~165° C. A steep increase in conversion was observed during light-off, consistent with CO coverage of the metallic surface at low temperature, followed by oxygen activation and light-off. Catalytic activity of the samples with ~10% of SBI PdO NPs in alumina were tested. FIG. 5A shows catalytic activity using 0.5% CO, 4.0% $O_2$, 95.5% Ar at 20 mL/min total Ramp from room temperature to 275° C. at 5° C./min. The samples were tested as synthesized (after removal of the polymer at 450° C. in oxygen flow) and after pretreatment at 275° C. for 30 minutes in hydrogen-containing and oxygen-containing atmospheres. FIG. 5B shows catalytic activity using 0.5% $CH_4$, 4.0% $O_2$, 95.5% Ar at 20 mL/min total Ramp from 275° C. to 575° C. at 10° C./min. Pretreatments of the samples were performed for 1 hour at 600° C., 700° C., and 800° C. FIG. 5C shows a TEM image of the samples after pre-treatment at 800° C. followed by the methane combustion reaction tests.

In the case of methane combustion (FIG. 6B), the samples were also active and demonstrated 100% methane conversion by ~550° C. Annealing of the samples at 600° C., 700° C., and 800° C. for 1 hour prior to the tests resulted in no observable changes in the activity of the samples, confirming their stability across the treatments. The physisorption data suggested that the materials demonstrate ~82.4 $m^2/g$ of the available surface area. The catalytic performance showed that efficient catalysts can be prepared through this method and that there is room for optimization of the materials by changing the synthesis conditions and pretreatment and calcination specifications. The high-temperature stability of these materials, as evidenced by overlaying $CH_4$ combustion curves, may be attributed to the decreased growth of PdO aggregates as a result of the effective sequestration of palladium materials within the alumina matrix.

Figure 7A:
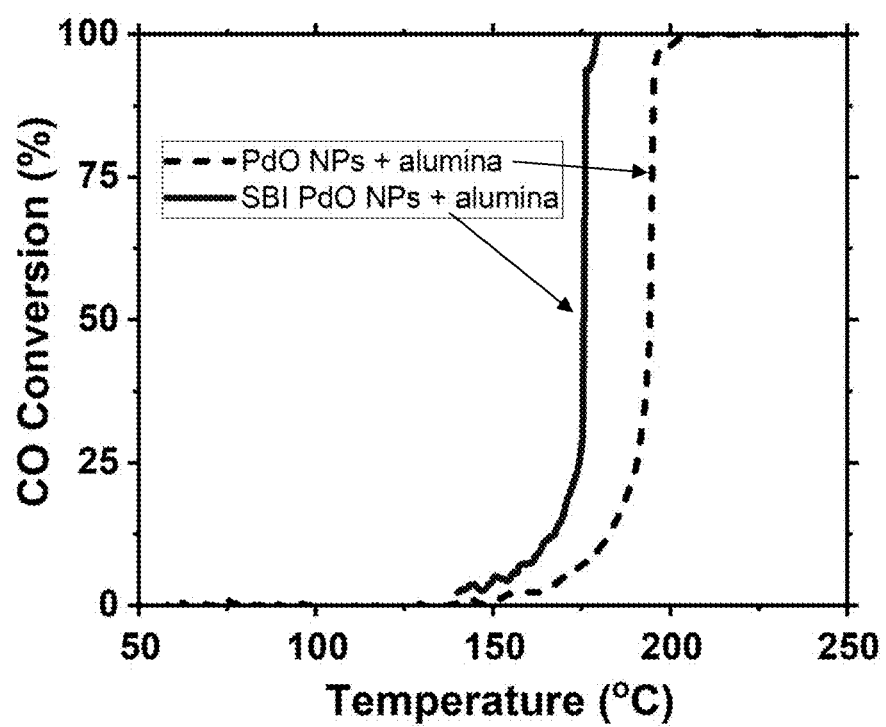
FIG. 7A is a graph showing a comparison of the catalytic activity of a porous composite ceramic material of Pd nanoparticles in alumina made by a method in accordance with embodiments of the disclosure in which a nanoparticle precursor was infiltrated into the block copolymer during the method (SBI PdNPs in alumina) against the catalytic activity of a porous ceramic material of Pd nanoparticles in alumina made by a method in accordance with embodiments of the disclosure in which pre-synthesized Pd nanoparticles were infiltrated into the block copolymer during the method (pre-synthesized PdNPs+alumina). The catalytic activity was for CO oxidation, wherein the gas was 0.5% CO, 4.0% $O_2$, 95.5% Ar at 20 mL/min and the total ramp was from r.t. to 275° C. at 5° C./min.
Figure 7B:
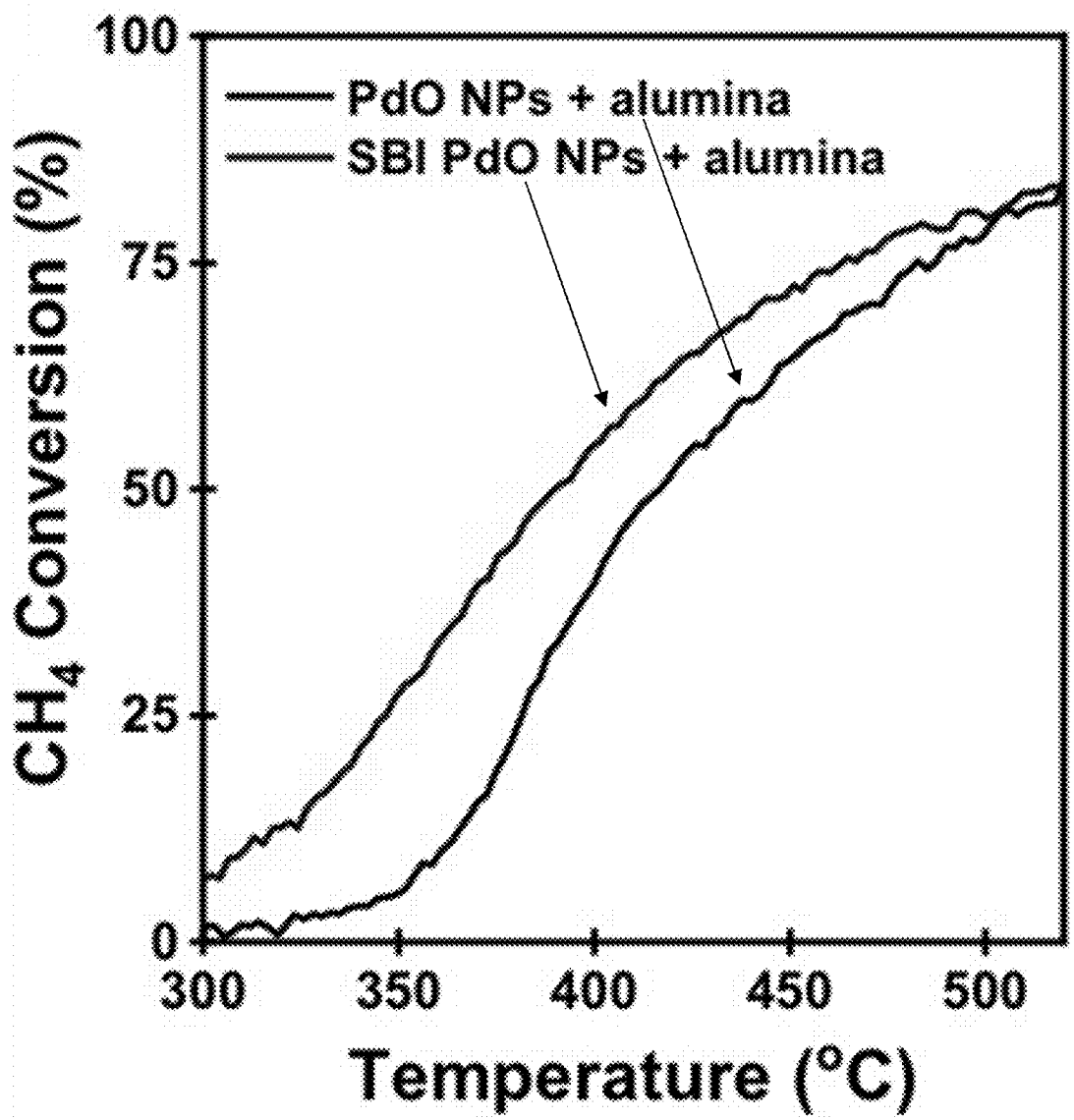
FIG. 7B is a graph showing a comparison of the catalytic activity of a porous composite ceramic material of Pd nanoparticles in alumina made by a method in accordance with embodiments of the disclosure in which a nanoparticle precursor was infiltrated into the block copolymer during the method (SBI PdNPs in alumina) against the catalytic activity of a porous ceramic material of Pd nanoparticles in alumina made by a method in accordance with embodiments of the disclosure in which pre-synthesized Pd nanoparticles were infiltrated into the block copolymer during the method (pre-synthesized PdNPs+alumina). The catalytic activity was for $CH_4$ oxidation, wherein the gas was 0.5% $CH_4$, 4.0% $O_2$, 95.5% Ar at 20 mL/min and the total ramp was from 275° C. to 575° C. at 10° C./min.
Figure 7C:
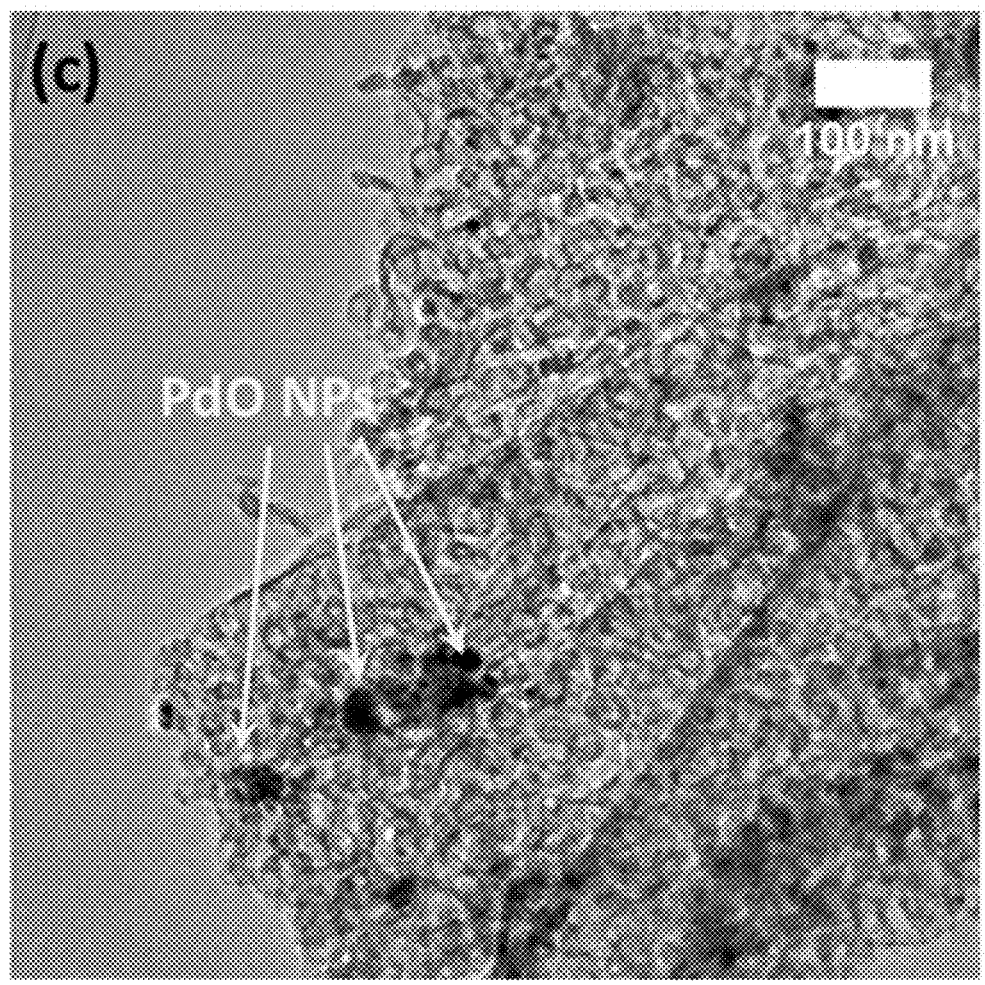
FIG. 7C is a TEM image of a porous composite ceramic material of Pd nanoparticles in alumina made by a method in accordance with embodiments of the disclosure in which pre-synthesized Pd nanoparticles were infiltrated into the block copolymer during the method after use of the material in catalysis.
Figure 8A:
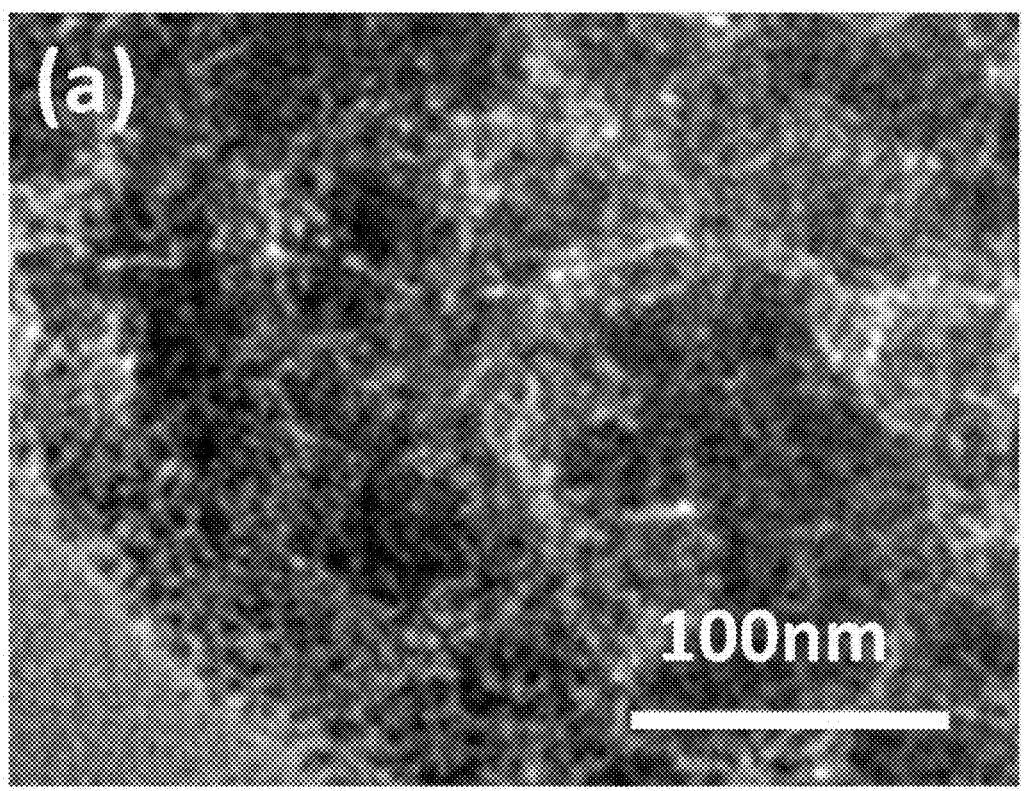
FIG. 8A is a TEM image of a porous composite ceramic material of Co nanoparticles in alumina made by a method in accordance with embodiments of the disclosure.
Figure 8B:
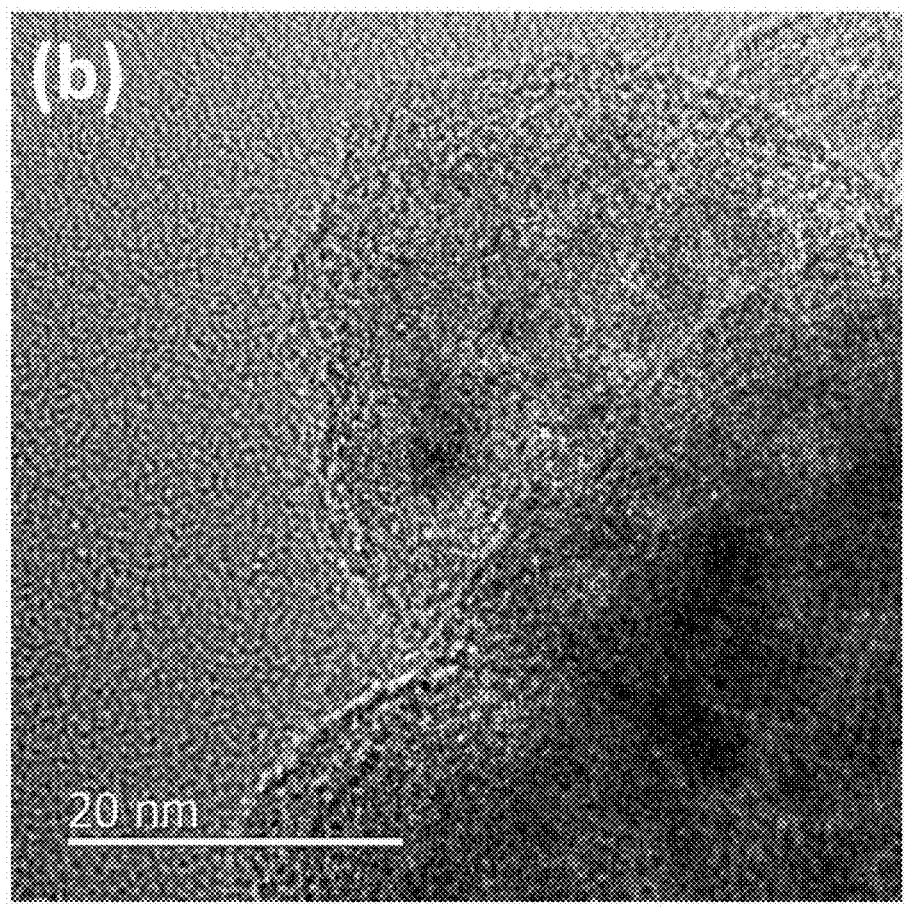
FIG. 8B is a TEM image of a porous composite ceramic material of Co nanoparticles in alumina made by a method in accordance with embodiments of the disclosure.
Figure 9A:
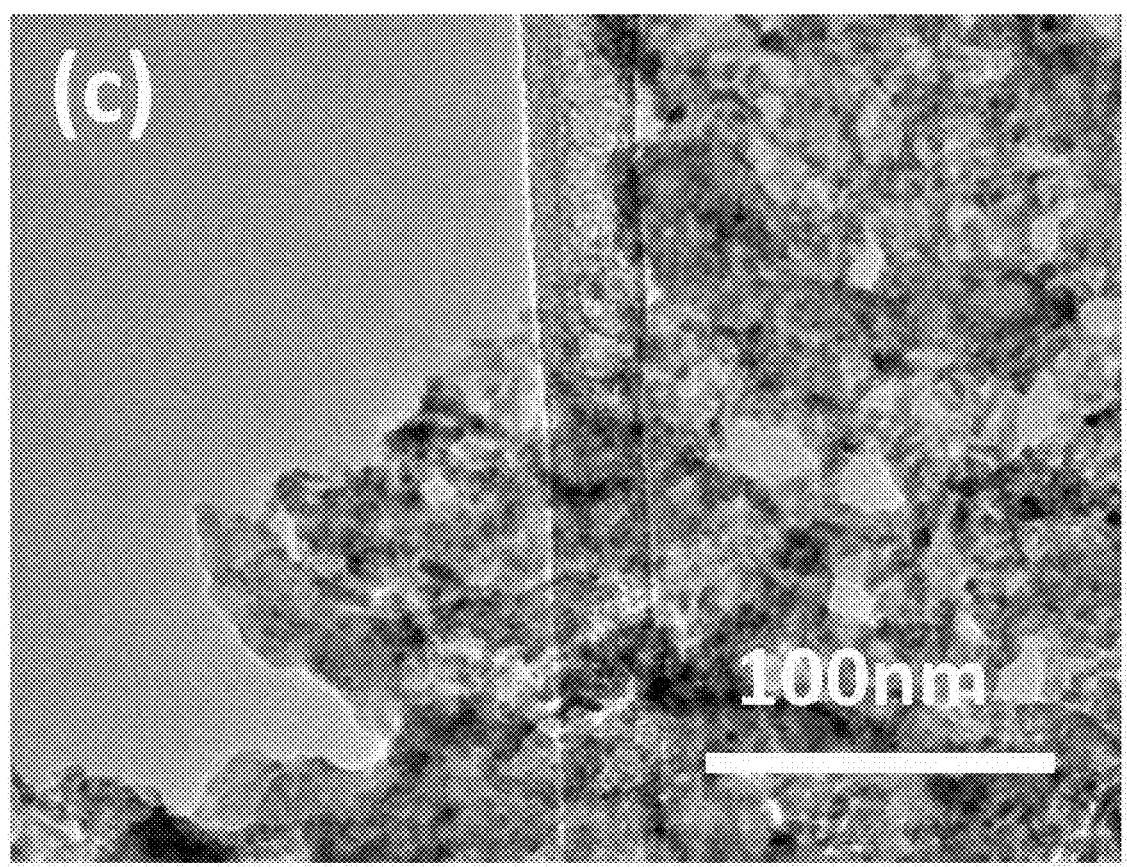
FIG. 9A is a TEM image of a porous composite ceramic material of Ru nanoparticles in alumina made by a method in accordance with embodiments of the disclosure.
Figure 9B:
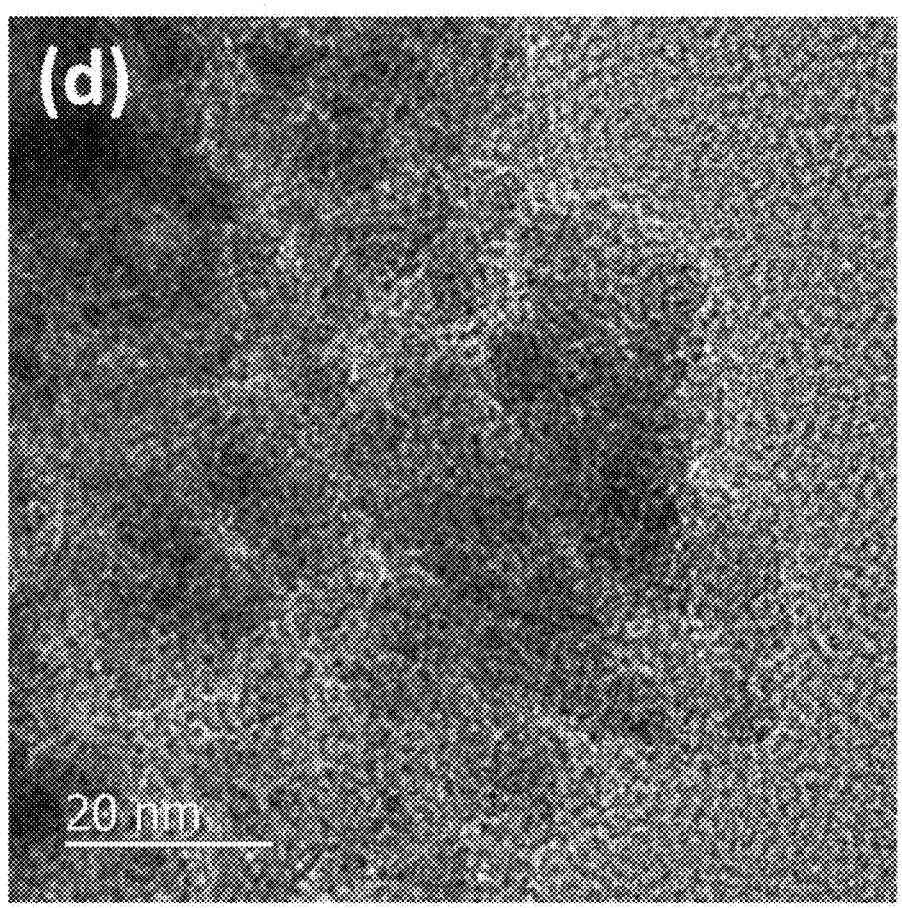
FIG. 9B is a TEM image of a porous composite ceramic material of Ru nanoparticles in alumina made by a method in accordance with embodiments of the disclosure.

Catalytic activity of the porous composite ceramic materials made from nanoparticle precursors in accordance with Example 1 (SBI PdNPs in alumina samples) was compared to the catalytic activity of porous composition ceramic materials made from pre-formed nanoparticles in accordance with Example 2 (pre-synthesized PdNPs+alumina) by repeating the catalytic activity experiments described above for the porous composite ceramic materials made from nanoparticle precursors in accordance with Example 1 (SBI PdNPs in alumina samples). The results are shown in FIG. 7A-7B. FIG. 7A used 0.5% CO, 4.0% $O_2$, 95.5% Ar at 20 mL/min with total ramp from r.t. to 275° C. at 5° C./min and FIG. 7B used 0.5% $CH_4$, 4.0% $O_2$, 95.5% Ar at 20 mL/min with total ramp from 275° C. to 575° C. at 10° C./min. A TEM image of PdNPs in alumina was taken after catalysis, FIG. 7C.

The results suggested that regardless of whether nanoparticle precursor or preformed nanoparticles are utilized, methods of the disclosure, resulted in higher activity, which is attributed to better stability of the samples enclosed in the alumina matrix. Meanwhile, TEM analysis of the samples prepared by Example 2 (pre-synthesized PdNPs+alumina) after the heating up to 550° C. during the methane combustion tests indicates some degree of the NPs sintering.

Figure 10A:
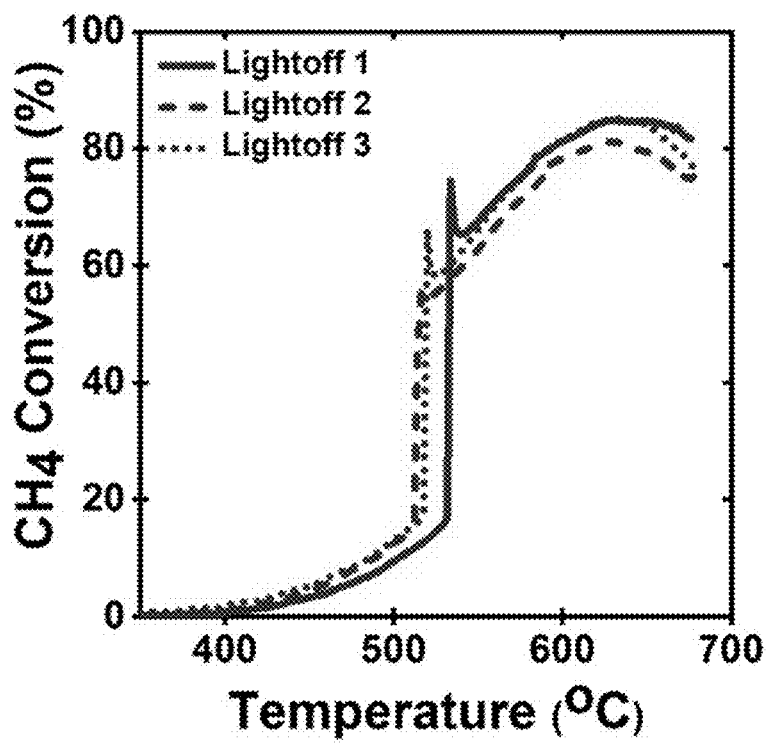
FIG. 10A is a graph showing the catalytic activity of a porous composite ceramic material of ruthenium oxide nanoparticles in alumina made by a method in accordance with embodiments of the disclosure. The catalytic activity was for $CH_4$ oxidation, wherein the gas was 3.05% $CH_4$, 1.5% $O_2$, and 95.45% Ar at 10° C./min ramp rate.
Figure 10B:
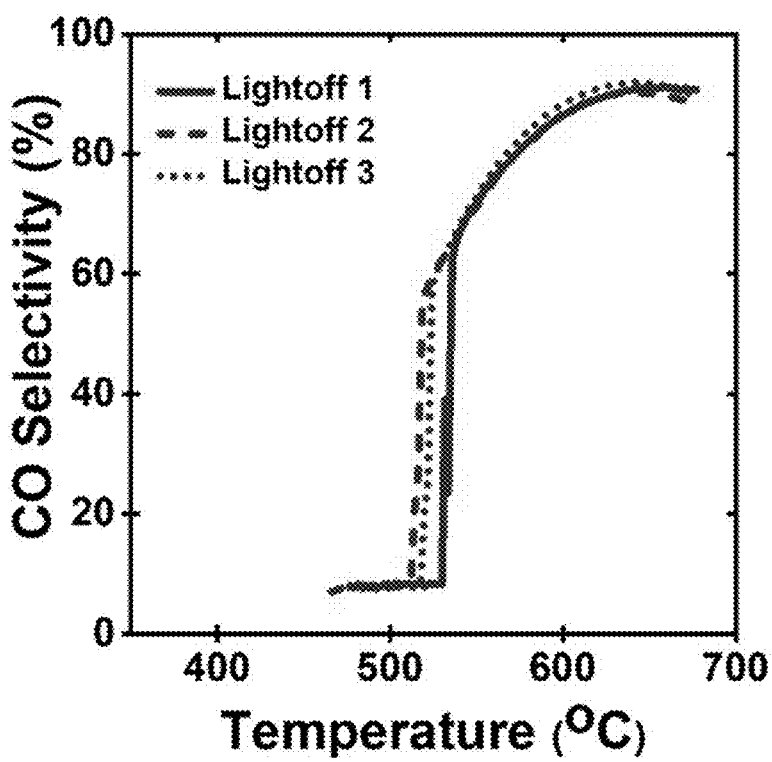
FIG. 10B is a graph showing the selectivity of a porous composite ceramic material of ruthenium oxide nanoparticles in alumina made by a method in accordance with embodiments of the disclosure. The catalytic activity was for CO oxidation, wherein the gas was 0.5% CO, 4.0% $O_2$, 95.5% Ar at 20 mL/min and the total ramp was from r.t. to 275° C. at 5° C./min.
Figure 10C:
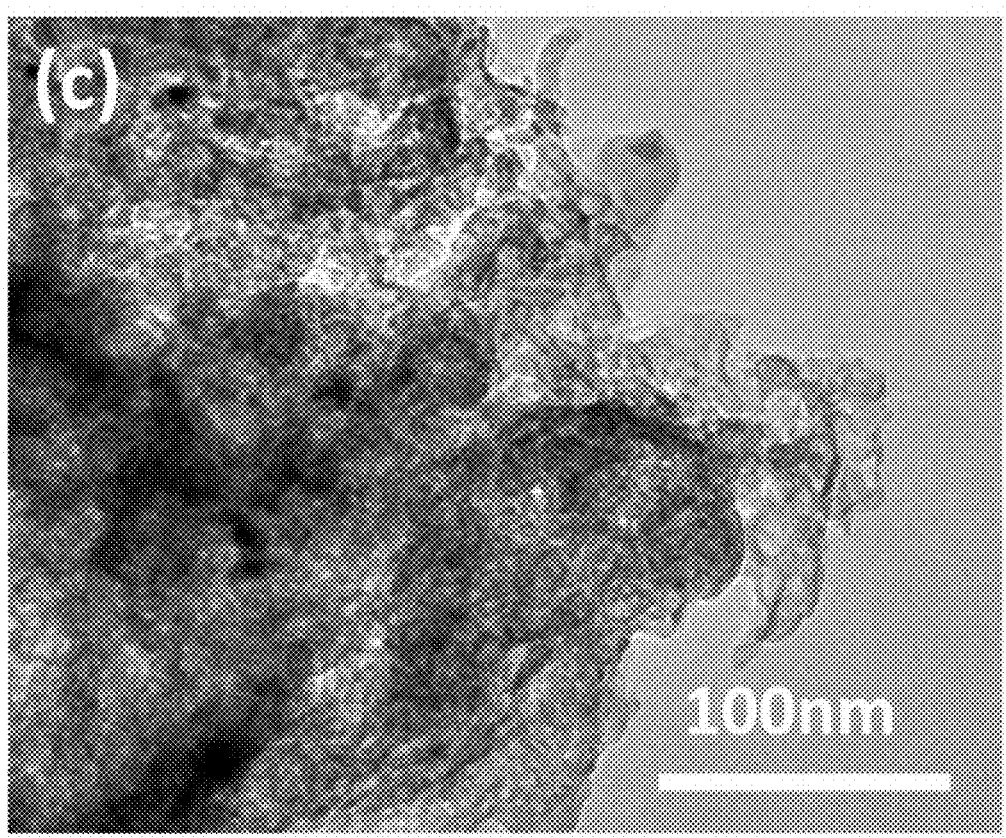
FIG. 10C is a TEM image of a porous composite ceramic material of ruthenium oxide nanoparticles in alumina made by a method in accordance with embodiments of the disclosure after the catalytic activity.
Figure 10D:
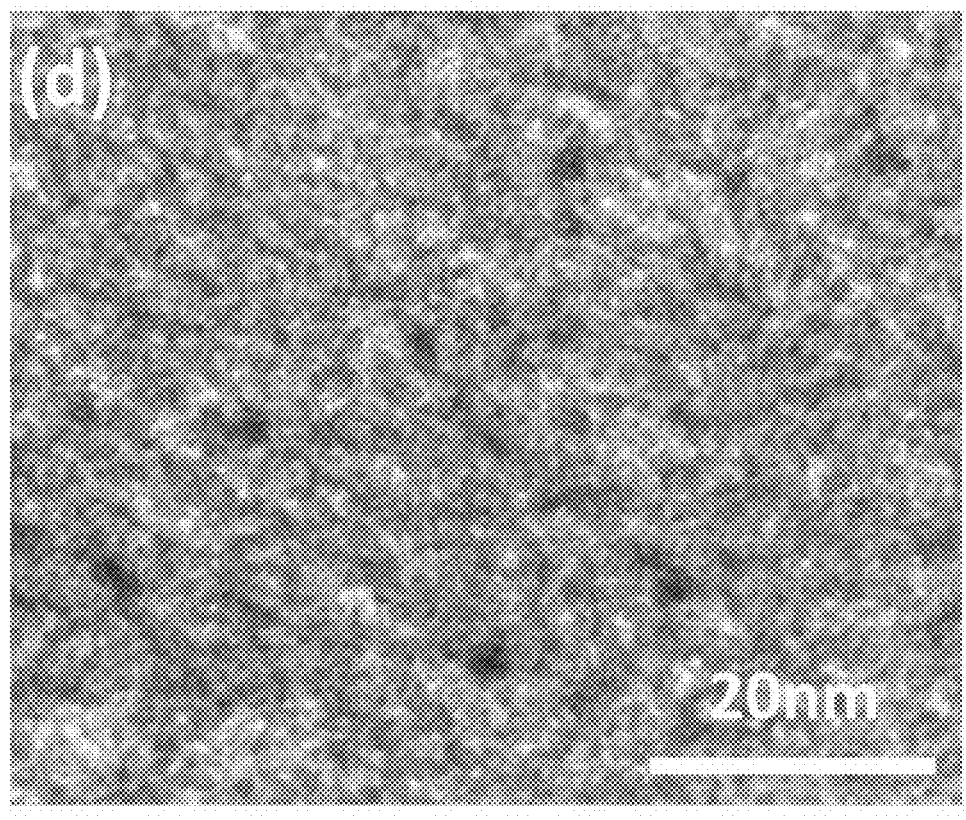
FIG. 10D is a TEM image of a porous composite ceramic material of ruthenium oxide nanoparticles in alumina made by a method in accordance with embodiments of the disclosure after the catalytic activity.

The porous composite ceramic material including ruthenium oxide nanoparticles in alumina (10 wt % loading in alumina) was both tested for both catalytic activity and selectivity. during methane partial oxidation to syngas reaction was done using The partial oxidation of methane and the CO selectivity was tested using 3.05% $CH_4$, 1.5% $O_2$, and 95.45% Ar at 10° C./min ramp rate (FIG. 10A-10B). Prior to the test, the sample was pretreated for 30 minutes in 5% $O_2$/Ar, for 10 minutes at Ar, and for 30 minutes at 5% $H_2$/Ar atmospheres. The sample shows stable activity and selectivity between light-off cycles. TEM images (FIGS. 10C-10D) of the samples after the catalytic activity tests up to 700° C. indicates thermal stability of the structures. High stability of the structures enabled the catalytic activity of Ru nanoparticles in alumina sample towards methane partial oxidation reaction while inhibiting their sintering The use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict embodiments for purposes of illustration only. One of ordinary skill in the art will readily recognize from the following discussion that alternative embodiments of the structures and methods illustrated herein may be employed without departing from the principles described herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method of preparing a porous composite ceramic material comprising nanoparticles embedded in an inorganic matrix, comprising:
    immersing a block copolymer having polar and nonpolar domains in a swelling solution comprising solvent and one or more nanoparticle precursors, wherein upon immersion in the swelling solution, the block copolymer swells and the nanoparticle precursor adsorbs onto functional groups in the polar domain of the swelled block copolymer to form a nanoparticle precursor infiltrated swelled block copolymer;
    exposing the nanoparticle precursor infiltrated swelled block copolymer to a gaseous inorganic matrix material precursor using one or more cycles of sequential infiltration synthesis (SIS) to infiltrate the polar domain with an inorganic matrix material and form an inorganic matrix infiltrated swelled block copolymer;
    removing the block copolymer and converting the nanoparticle precursor to nanoparticles by one or more of thermally annealing the inorganic matrix infiltrated swelled block copolymer in the presence of oxygen at a temperature in the range of 300° C. to 700° C., exposing the inorganic matrix infiltrated swelled block copolymer to $O_2$ plasma, and irradiating the inorganic matrix infiltrated block copolymer with UV light in the presence of ozone, thereby forming the porous composite ceramic material.

2. The method of claim 1, wherein the polar domain comprises one or more of poly(vinyl-substituted nitrogen heterocycle)s, poly(alkyl (meth)acrylate)s, poly((meth)acrylic acid)s, poly(alkylene oxide)s, poly(arylene oxide)s, poly(arylene sulfide)s, poly(vinyl alkanoates), poly(vinyl ether)s, poly(vinyl halide)s, poly(vinyl alcohol)s, polyurethanes, poly(meth)acrylonitriles, polyesters, polyamides, polyimides, polycarbonates, polysulfones, and polysiloxanes.

3. The method of claim 1, wherein the non-polar domain comprises one or more of polyolefins, poly(alkenyl aromatic)s, poly(conjugated dienes, hydrogenated poly (conjugated dienes).

4. The method of claim 1, wherein the block copolymer is immersed in the swelling solution at a temperature of about 50° C. to about 100° C.

5. The method of claim 1, wherein the nanoparticle precursor comprises a metal complex and the metal complex comprises a transition metal salt.

6. The method of claim 1, comprising exposing the nanoparticle precursor infiltrated swelled block copolymer to the gaseous inorganic matrix material precursor at a temperature of about 50° C. to about 150° C.

7. The method of claim 1, wherein the gaseous inorganic matrix material precursor comprises one or more of trimethyl aluminum, $AlBr_3$, $AlCl_3$, aluminum nitride, aluminum hydroxide, diethyl zinc, (N,N-dimethylamino)trimethylsilane, vinyltrimethoxysilane, trivinylmethoxysilane, tetrakis(dimethylamino)silane, tris(dimethylamino)silane (TDMAS), $TiCl_4$, titanium tetraisopropoxide (TTIP), and tetrakis(ethylmethylamino)hafnium.

8. The method of claim 1, comprising thermally annealing the inorganic matrix infiltrated swelled block copolymer in the presence of oxygen.

9. The method of claim 1, comprising irradiating the inorganic matrix infiltrated swelled block copolymer with UV light in the presence of ozone.

10. A porous composite ceramic material as prepared by the method of claim 1.

11. The porous composite ceramic material of claim 10, wherein the porous composite ceramic material is resistant to sintering at a temperature of up to about 900° C.

12. A method of preparing a porous composite ceramic material comprising nanoparticles embedded in an inorganic matrix, comprising:
immersing nanoparticles and a block copolymer having polar and nonpolar domains in a swelling solution comprising solvent, wherein upon immersion in the swelling solution, the block copolymer swells and the nanoparticles adsorb onto functional groups in the nonpolar domains of the swelled block copolymer to form a nanoparticle infiltrated swelled block copolymer;
exposing the nanoparticle infiltrated swelled block copolymer to a gaseous inorganic matrix material precursor using one or more cycles of sequential infiltration synthesis to infiltrate the polar domains with an inorganic matrix material and form an inorganic matrix infiltrated swelled block copolymer;
removing the block copolymer by one or more of thermally annealing the inorganic matrix infiltrated swelled block copolymer in the presence of oxygen at a temperature in the range of 300° C. to 700° C., exposing the inorganic matrix infiltrated swelled block copolymer to $O_2$ plasma, and irradiating the inorganic matrix infiltrated swelled block copolymer with UV light in the presence of ozone, to thereby form the porous composite ceramic material.

13. The method of claim 12, wherein the polar domain comprises one or more of poly(vinyl-substituted nitrogen heterocycle)s, poly(alkyl (meth)acrylate)s, poly((meth)acrylic acid)s, poly(alkylene oxide)s, poly(arylene oxide)s, poly(arylene sulfide)s, poly(vinyl alkanoates), poly(vinyl ether)s, poly(vinyl halide)s, poly(vinyl alcohol)s, polyurethanes, poly(meth)acrylonitriles, polyesters, polyamides, polyimides, polycarbonates, polysulfones, and polysiloxanes.

14. The method of claim 12, wherein the non-polar domain comprises one or more of polyolefins, poly(alkenyl aromatic)s, poly(conjugated dienes), hydrogenated poly (conjugated dienes).

15. The method of claim 12, further comprising heating during immersion of the block copolymer in the solvent to a temperature of about 50° C. to about 100° C. during swelling of the block copolymer.

16. The method of claim 12, wherein the nanoparticles comprise one or more transition metals and transition metal oxides.

17. The method of claim 16, wherein the nanoparticles comprise one or more of Ag, Au, $Pd_xO_y$, $Pt_xO_y$, $Co_xO_y$, $Ru_xO_y$, $Mn_xO_yFe_xO_y$, and $Mg_xO_y$ wherein x is from 0.1 to 4 and y is from 0.1 to 7.

18. The method of claim 12, comprising exposing the nanoparticle infiltrated swelled block copolymer to the gaseous inorganic precursor at a temperature of about 50° C. to about 150° C.

19. The method of claim 12, wherein the gaseous inorganic matrix material precursor comprises one or more of trimethyl aluminum, $AlBr_3$, $AlCl_3$, aluminum nitride, aluminum hydroxide, diethyl zinc, (N,N-dimethylamino)trimethylsilane, vinyltrimethoxysilane, trivinylmethoxysilane, tetrakis(dimethylamino)silane, tris(dimethylamino)silane (TDMAS), $TiCl_4$, titanium tetraisopropoxide (TTIP), and tetrakis(ethylmethylamino)hafnium.

* * * * *